United States Patent
Bard et al.

[11] Patent Number: 5,856,660
[45] Date of Patent: Jan. 5, 1999

[54] STATUS/CONDITION INDICATING ARRANGEMENT FOR USE IN ELECTRO-OPTICAL SYSTEMS FOR READING INDICIA

[75] Inventors: Simon Bard, Setauket; Edward Barkan, Miller Place; Michael Fusco, Smithtown, all of N.Y.; Anthony Fama, Phoenix, Ariz.; Paul Poloniewicz, East Setauket; Anthony Biuso, South Setauket, both of N.Y.; Laura Wilson, Raleigh, N.C.; Steven M. Chew, East Northport; John Barile, Holbrook, both of N.Y.

[73] Assignee: Symbol Technologies, Inc., Holtsville, N.Y.

[21] Appl. No.: 842,278

[22] Filed: Apr. 24, 1997

Related U.S. Application Data

[62] Division of Ser. No. 536,734, Sep. 29, 1995, abandoned, which is a continuation of Ser. No. 294,865, Aug. 29, 1994, Pat. No. 5,740,274, which is a continuation-in-part of Ser. No. 68,025, May 28, 1993, abandoned, and Ser. No. 884,734, May 15, 1992, abandoned.

[51] Int. Cl.$^6$ ........................................................ G06K 7/10
[52] U.S. Cl. ............................................. 235/462; 235/455
[58] Field of Search .................................. 235/462, 472, 235/454, 455

[56] References Cited

U.S. PATENT DOCUMENTS

| | | | |
|---|---|---|---|
| 4,521,678 | 6/1985 | Winter | 235/472 |
| 4,916,441 | 4/1990 | Gombrich | 235/462 X |
| 5,157,687 | 10/1992 | Tymes | 235/462 X |

*Primary Examiner*—Anita Pellman Gross
*Assistant Examiner*—Karl Frech
*Attorney, Agent, or Firm*—Kirschstein, et al.

[57] ABSTRACT

A scanner interface is operatively connected to an electro-optical scanner for scanning bar code symbols. A status/condition interface is operatively connected with a system component, e.g., a photodetector, a decoder, a battery, etc., whose status/condition is to be monitored. Threshold information about the system component is stored in a memory. A system processor generates updated information about the system component during scanning, compares the updated information with the threshold information and generates an output signal upon such comparison. In response to the output signal, an indicator signals a user as to the status/condition of the system component.

10 Claims, 19 Drawing Sheets

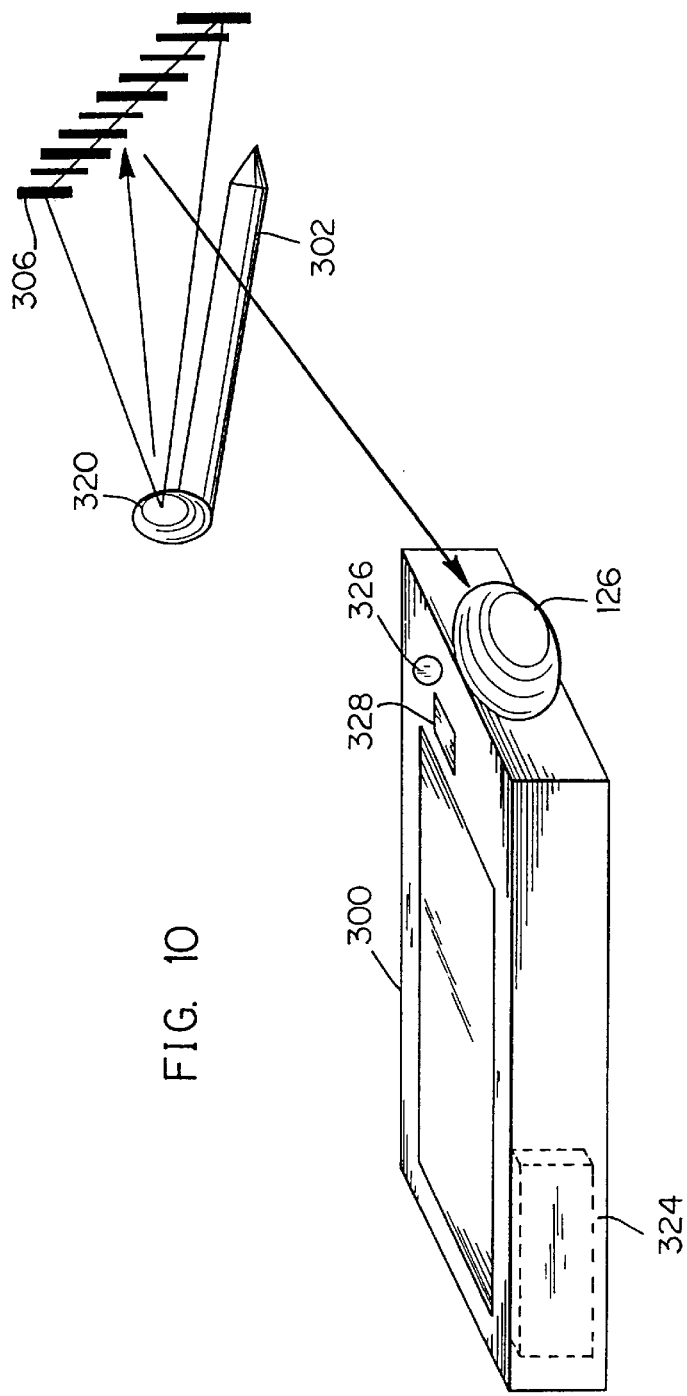
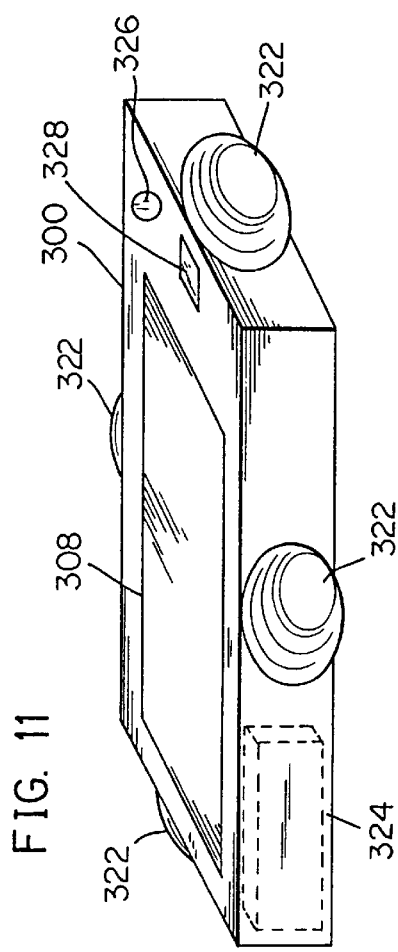
FIG. 10
FIG. 11

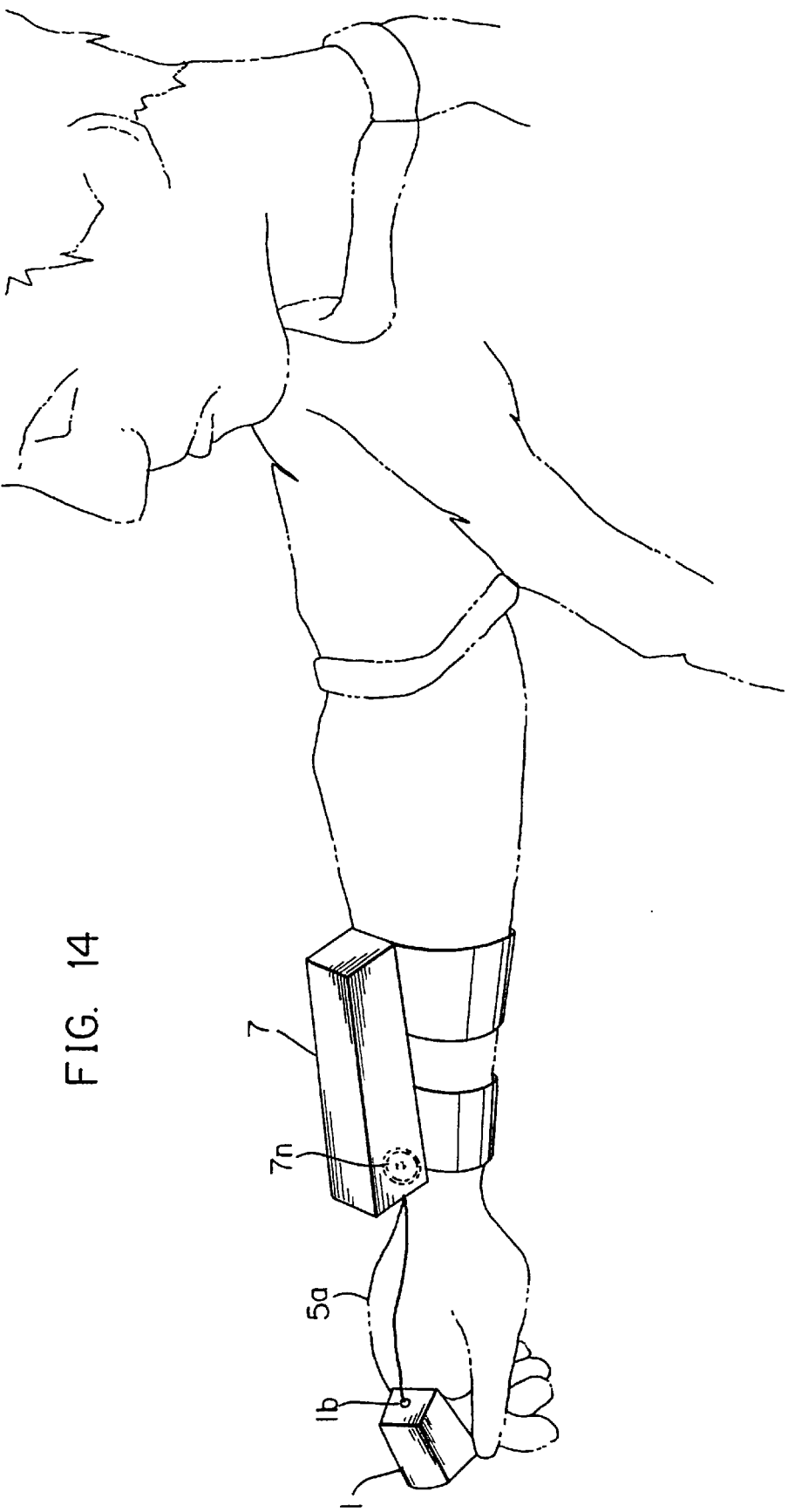

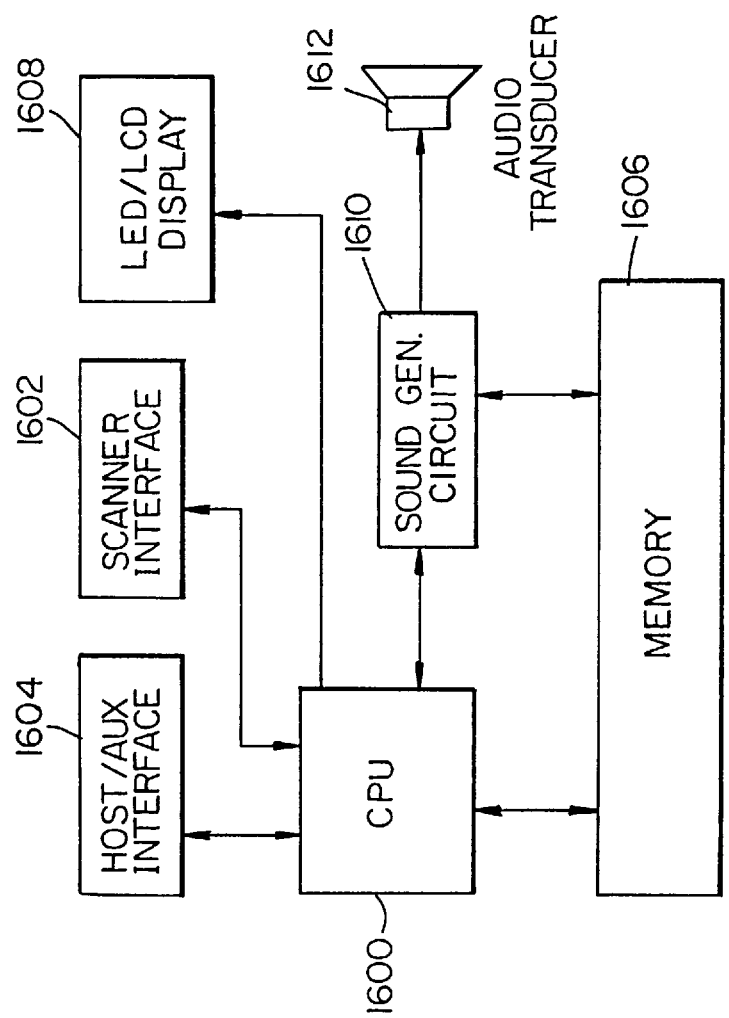

FIG. 16B

| Status/Conditions |
|---|
| A bar code symbol was decoded |
| Power on reset |
| Low battery power |
| • 1-D and PDF decoder buffer is full<br>• Macro PDF decoder out of buffer space<br>• Macro PDF decoder out of heap space |
| Correct parameter entry sequence performed |
| Parameter entry error |
| • Successful parameter entry program exit<br>• ADF rule saved |
| Serial communications error |
| • Missing Macro PDF file ID<br>• Bad Macro PDF file ID<br>• Bad Macro PDF optional field |
| • Duplicated Macro PDF symbol<br>• Macro PDF symbol out of sequence |
| ADF entry error - a number is expected |
| ADF entry error - an alphabetic character is expected |
| ADF entry error - criteria/action is expected |
| ADF criteria or actions cleared for rule being entered |
| Last ADF saved rule successfully deleted |
| All ADF rules erased |

STATUS/CONDITION INDICATING ARRANGEMENT FOR USE IN ELECTRO-OPTICAL SYSTEMS FOR READING INDICIA

RELATED APPLICATIONS

This application is a division of U.S. application Ser. No. 08/536,734, filed Sep. 29, 1995, now abandoned which is a continuation of U.S. application Ser. No. 08/294,865, filed Aug. 29, 1994, now U.S. Pat. No. 5,740,274, which is Continuation-in-Part of U.S. application Ser. No. 08/068, 025 filed May 28, 1993, now abandoned and of U.S. application Ser. No. 07/884,734 filed on May 15, 1992, now abandoned and is related to U.S. application Ser. Nos. 08/068,024 filed May 28, 1993, now U.S. Pat. No. 5,416, 310, and U.S. Ser. No. 08/068,026 filed May 28, 1993 now abandoned.

BACKGROUND OF INVENTION

1. Field of the Invention

This invention relates to portable optical scanners for reading indicia of varying light reflectivity and, more particularly, to a portable optical scanning system having the capability to transmit and/or receive information over one or more radio or infrared (IR) frequencies, and optionally housing the light emitter and reflected light detecting elements in separate unconnected housings that are adapted to be worn by a user or attached to an article of clothing worn by a user.

2. Description of the Related Art

Various optical readers and optical scanning systems have been developed heretofore for reading indicia such as bar code symbols appearing on the label or on the surface of an article. The symbol itself is a coded pattern of indicia comprised of, for example, a series of bars of various widths spaced apart from one another to bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing system for applications in point-of-sale processing, inventory control and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application. As disclosed in the above patents, one embodiment of such scanning systems includes, inter alia, a hand held, portable laser scanning device supported by a user, which is configured to allow the user to aim the scanning head of the device, and more particularly, a light beam, at a targeted symbol to be read.

One type of portable prior art scanning device is shown in FIG. 1. Conventionally, the device includes a hand mounted scanning unit 200 which includes an optical scanner. The optical scanner conventionally has a light generator, such as a laser diode, for producing a light beam which is scanned across the target symbol. The scanner unit 200 also conventionally includes a photodetector for detecting the reflection of light from the light beam off symbol and for producing an electrical signal corresponding to the detected light and representative of the symbol. The scanning unit may be activated by a triggering mechanism, such as a movable trigger switch or by triggerless means, for example, using active or passive photosensing.

A battery pack 202 is also mounted to the user 206 and provides power to the scanning unit 200 through cable 208. Module 204 which might typically include signal processing and data storage subsystems is mounted to the user's wrist or arm opposite the hand on which the scanning unit 200 is mounted. As shown, the scanning unit 200 is mounted on the user's right hand and the module 204 is mounted on the user's left wrist, however the side of the body upon which each is located could be reversed if so desired. Alternatively unit 200 and module 204 could be supported by the hand and arm on the same side at the user's body, for example, the right hand and arm. The module 204 is also connected to battery pack 202 by cable 202 which facilitates the transmission of electricity to the power module 204. Cables 208 and 208 also serve as a conduit for a communications link between scanning unit 200 and module 204. Signals generated by the photodetector in scanning unit 200 are transmitted to module 204 via this communication link for processing and/or storage.

The light source in a laser scanner bar code reader is typically a gas laser or semiconductor laser. The use of semiconductor devices as the light source is especially desirable because of their small size, low cost and low voltage requirements. The laser beam is optically modified, typically by an optical assembly, to form a beam spot of a certain size at the target distance. It is preferred that the cross section of the beam spot at the target distance be approximately the same as the minimum width between regions of different light reflectivity, e.g., the bars and spaces of symbol. Bar code readers have been proposed with two light sources to produce two light beams.

Bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) is referred to as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies exist, these symbologies include UPC/EAN, Code 39, Code 128, Codeabar, and Interleaved 2 of 5 etc.

In order to increase the amount of data that can be represented or stored on a given amount of surface area, several new bar code symbologies have recently been developed. One of these new code standards, Code 49, introduces a "two dimensional" concept for stacking rows of characters vertically instead of extending the bars horizontally. That is, there are several rows of bar and space patterns, instead of only one row. The structure of Code 49 is described in U.S. Pat. No. 4,794,239, which is hereby incorporated by reference. Another two-dimensional symbology, known as "PDF417", is described in U.S. Pat. No. 5,304,786.

Still other symbologies have been developed in which the symbol is comprised of a matrix array made up of hexagonal, square, polygonal and/or other geometric shapes to form a symbol. Such symbols are further described in, for example, U.S. Pat. No. 5,276,315. Such symbols may include Vericode™, Datacode™ and UPScode™. Prior art FIGS. 18A–18C depict known matrix and other type symbols.

In the laser beam scanning systems known in the art, the laser light beam is directed by a lens or other optical components along the light path toward a target that includes a symbol on the surface. The moving-beam scanner operates by repetitively scanning the light beam in a line or series of lines across the symbol by means of motion of a scanning component, such as, the light source itself or a mirror disposed in the path of the light beam. The scanning component may either sweep the beam spot across the symbol and trace a scan line across the pattern of the symbol, or scan the field of view of the scanner, or perform some condition thereof.

Other conventional scanning systems require the physical movement of the scanning unit by the user to obtain a reading from the targeted symbol. For example, pen computers as shown in prior art FIG. 9 have a pen 302 associated with the computer module 300.

Bar code reading systems also include a sensor or photo detector which detects light reflected or scattered from the symbol. The photo detector or sensor is positioned in the scanner in an optical path so that it has a field of view which ensures the capture of a portion of the light which is reflected or scattered off the symbol. An electrical signal corresponding to the detected light is generated. Electronic circuitry and software decodes the electrical signal into a digital representation of the data represented by the symbol that has been scanned. For example, the analog electrical signal generated by the photo detector is converted by a digitizer into a pulse modulated digital signal, with the widths corresponding to the physical widths of the bars and spaces of a scanned bar code symbol. The digitized signal is then decoded, based on the specific symbology used by the symbol, into a binary representation of the data encoded in the symbol, and subsequently to the alphanumeric characters so represented.

The decoding process of known bar code reading system usually works in the following way. The decoder receives the pulse width modulated digital signal from the digitizer, and an algorithm, implemented in the software, attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Systems have been developed which incorporate optical indicia reading capabilities in pen computers of the type shown in FIG. 7. Typical of these conventional systems are those shown in prior art FIGS. 8 and 9.

In the FIG. 8 system, the computer module has been modified to include a scanning unit 304 which generates a light beam which scans the targeted symbol 306. The scanning unit 304 also includes a photodetector which detects the reflection of light from the symbol and generates an electrical signal representing the scanned symbol 306. The electrical signal may be processed and/or stored in the computer module 300. Module 300 may also include a touch screen display, 308 for inputting data to the system and/or displaying the data representing the symbol.

In the FIG. 9 system, the pen computer has been modified such that pen module 302 includes a scanning unit 312 which generates a light beam which scans the targeted symbol 306 by physically moving the pen 302 across the target symbol 306. The scanning unit 312 also includes a photodetector which detects the reflection of light from the symbol and generates an electrical signal representing the scanned symbol 306. The electrical signal is transformed into a radio frequency, infrared, acoustic or other modulated wireless communication signal and transmitted by transmitter 312 to the computer module receiver 314. The received signal may be processed and/or stored in the computer module 300. Module 300 may also include a touch screen display, 308 for inputting data to the system and/or displaying the data representing the symbol.

Moving-beam laser scanners are not the only type of optical instrument capable of reading symbols. Another type of reader is one which incorporates detectors based on charge coupled device (CCD) technology. In such prior art readers the sides of the detector are typically smaller than the symbol to be read because of the image reduction by the objective lens in front of the CCD. The entire symbol is flooded with light from a light source such as a light emitting diode (LED) in the scanning device, and each CCD cell is sequentially read out to determine the presence of, for example, a bar or a space.

The working range of CCD scanners is rather limited as compared to laser based scanners and is especially low for CCD based scanners with an LED illumination source. Other features of CCD based scanners are set forth in U.S. patent application Ser. No. 08/041,281 which is hereby incorporated by reference, and in U.S. Pat. No. 5,210,398. These references are illustrative of the earlier technological techniques proposed for use in CCD type scanners to acquire and read indicia in which information is arranged in a two dimensional pattern.

Various systems, in addition to those conventional systems described above, have been proposed to improve the ease of use of optical scanning systems. Such systems have included miniature optical scanning modules which include light emitters and detectors which are mounted on a hand. These systems have also included a separate module mounted on the body or arm or wrist of a user with a wire communication link to the optical scan module. Such systems have also included wireless communication devices to allow communications between the second module and a base station, typically using radio frequency communications. However, such systems are either cumbersome, in that they require the user to wear a vest or belt or other body mounting apparel or require the use of a restrictive hand mount. One such system requires the use of a glove in which the wire for communications between the optical scan module and a second module are transmitted. Further, systems which require only a hand mounted optical scan module and wrist/arm mounted second module have had capacity limitations which limit the amount of processing and data storage which can be performed by the portable modules.

As noted above, pen computers have also been proposed for use in optical scanning applications. However, locating the optical scan module in the computer module may be ergonomically disadvantageous since it may be difficult for the user to orient the computer module in the necessary direction in order to get a satisfactory reading of the indicia. Incorporating the optical scan module in the pen module requires a communications line to transmit a signal representing the indicia to the computer module. Additionally, incorporating the optical scan module with both light emitting and light detecting devices in the pen module causes an increase in the physical size and weight of the pen. It will be understood that these size and weight increases are caused by both the additional components and the battery cells required to power them.

Thus, there remains a need for a portable optical scanning system in which all body mounted components can be mounted on the hand, wrist or arm of a user and do not require a vest, glove or other apparel or restrictive mounting mechanisms to be worn by the user. There also remains a need for a totally wireless body mounted portable optical scan system and even more preferably one which has only a hand mounted optical scan module and wrist or arm mounted second module, and is capable of transmitting and receiving data from a base station. A still further need exists for a portable optical scanning system which is ergonomically more acceptable to users.

It is a general object of the present invention to provide an improved portable indicia reader.

Thus, it is an object of the present invention to provide a portable optical scanning system which is more comfortably mounted on the user's body.

It is a further object of the invention to provide a portable optical scanning system which can be mounted on the user without the need for a vest, glove or other restrictive apparel being worn by the user.

It is a still further object of the present invention to provide a portable optical scanning system which does not require wires between system modules.

It is another object of the present invention to provide a portable optical scanning system which can be entirely mounted to either the right hand and wrist/arm or the left hand and wrist/arm.

A still further object of the invention is to provide a portable optical scanning system with improved ergonomics.

It is also an object of the invention to provide a portable optical scanning system capable of reading indicia of different symbology types including indicia comprised of a matrix array of geometric set shapes such as UPSCode™.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields which are within the scope of the invention as disclosed and claimed herein and with respect to which the invention could be of significant utility.

SUMMARY OF THE INVENTION

In accordance with the invention, a scanner interface is operatively connected to an electro-optical scanner for scanning bar code symbols. A status/condition interface is operatively connected with a system component, e.g., a photodetector, a decoder, a battery, etc., whose status/condition is to be monitored. Threshold information about the system component is stored in a memory. A system processor generates updated information about the system component during scanning, compares the updated information with the threshold information and generates an output signal upon such comparison. In response to the output signal, an indicator signals a user as to the status/condition of the system component.

BRIEF DESCRIPTION OF THE DRAWINGS

FIG. 10 depicts a pen scanner and computer in accordance with a fourth embodiment of the present invention.

FIG. 11 depicts a second configuration of the pen computer in accordance with the present invention.

FIG. 14 depicts a cable retraction mechanism adapted for use in the embodiments of FIGS. 2, 3 and 5.

FIGS. 16A and 16B are respectively a block diagram of an indicator subsystem suitable for use in any of the embodiments of the invention described above and a list of status/conditions of which a user can be notified using the FIG. 16A subsystem.

DESCRIPTION OF THE PREFERRED EMBODIMENT

Figure 1:
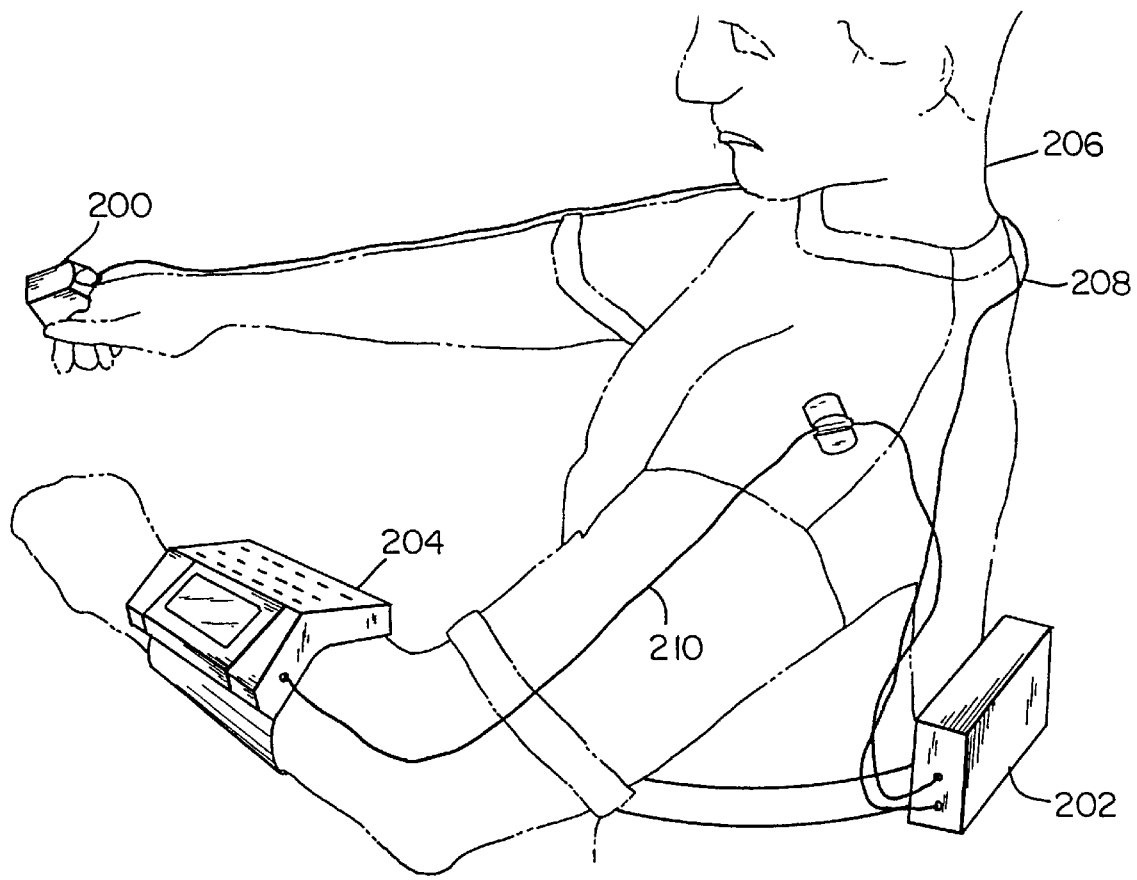
FIG. 1 depicts a conventional portable optical scan system.
Figure 2:
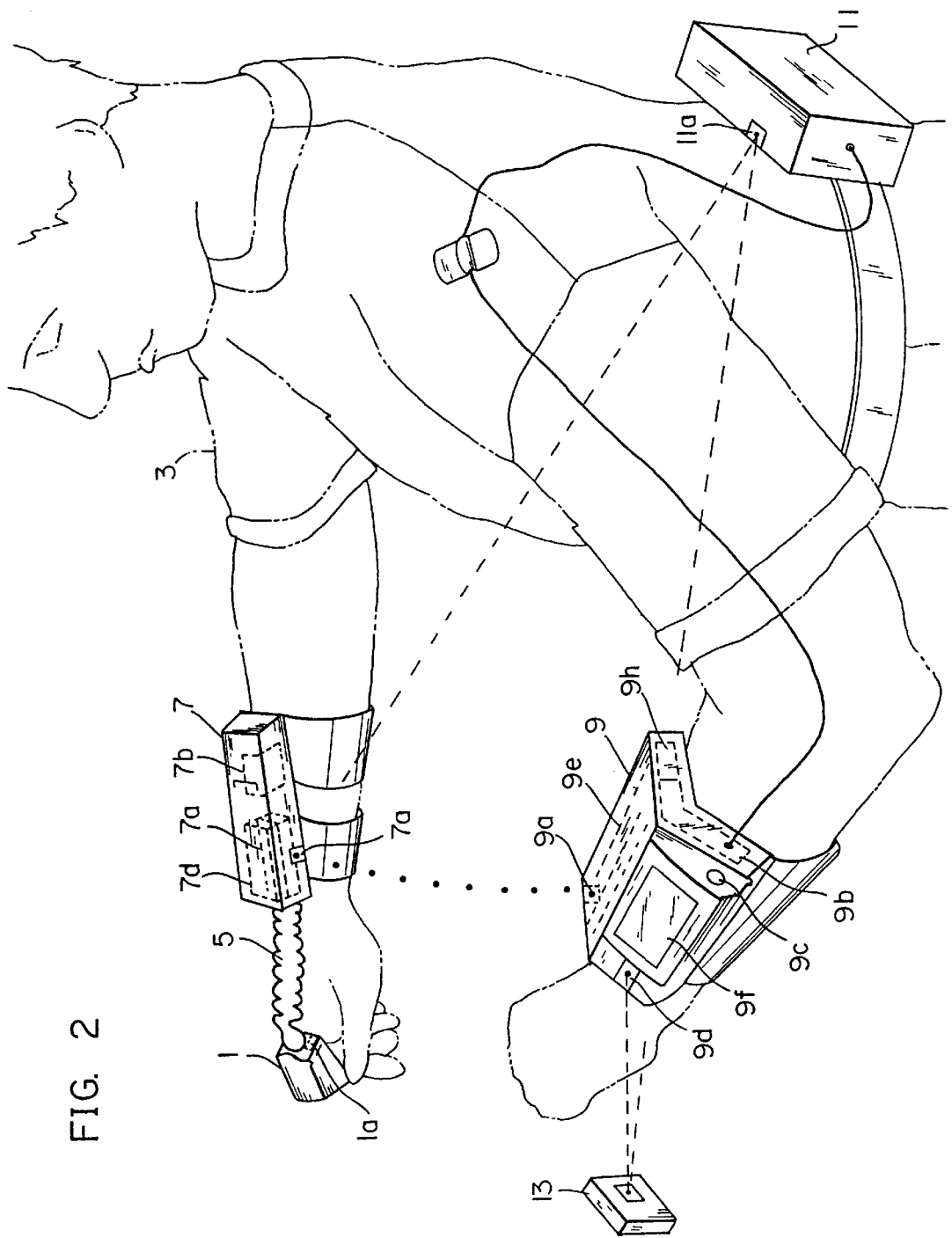
FIG. 2 depicts a portable optical scan system in accordance with the first embodiment of the invention.

FIG. 2 shows a portable optical scan system in accordance with a first embodiment of the present invention. An optical scan module 1 is detachably mounted on a single finger of a user 3 using a ring shaped mounting. The detachable mounting may be of any number of conventional types suitably adapted for its ease of use for the desired application. For example, a ball and flexible socket mounting or a slide mounting could be used. Other mountings with movable restraining members might also be used. The optical scan module 1 includes a light emitter and light detector. The light emitter typically includes an optical component such as a mirror and lens as well as a mechanism for oscillating or reciprocating components of the light emitter to cause a scan across the target indicia. The light emitter and detector are beneficially activated by a switch which may be responsive to sound or to light level variations or to physical or manual operation. The switch might, for example, include a manually operated trigger switch or an active or passive photosensor. In the preferred embodiment, the switch can optionally be locked in an "on" position so that the scan module components remain activated without, for example, the need to continue to squeeze a trigger. Voice activation is preferably implemented as described below with reference to FIGS. 15A and 15B.

An electromagnetic device and spring assembly or scan motor or other means can be used to drive the scan function. Alternatively, the scan can be performed with stationary light emitter components by physically moving the optical scan module 1 across the indicia.

The light emitter will typically include one or more light generators, for example light emitting or laser diodes, which are housed in the optical scan module 1. The optical scan module 1 may also include one or more light detectors which are typically photosensors such as a charge coupled or other solid state imaging device or photodetector such as photodiodes. These components could alternatively be housed in the first peripheral module 7. If a charge coupled device or other imaging device is utilized, it may be possible to detect the reflection of either ambient light or emitted light from the targeted indicia. It may be desirable to use an optical scan module and mounting of the type shown in FIG. 12 or 13 of U.S. patent application Ser. No. 07/884,734.

The optical scan module 1 is connected to a first peripheral module 7 by a flexible cable 5. The cable 5 is preferably retractable so that a minimum length of cable is exposed during operation. The retraction mechanism may be adapted from any of a number of conventional retraction techniques and systems. For example, recess 7m in first peripheral module 7 is provided for retracting cable 5. A more sophisticate retraction system is shown in FIG. 14. The first peripheral module 7 preferably houses a power supply 7a for powering the components of optical scan module 1. Module 1 is connected to the power supply 7a by an electrical conductor, such as a copper wire, in cable 5. The power supply would typically be a battery. Alternatively, the power supply could be located in optical scan module 1, however this may reduce the operating time between recharge or replacement of the battery.

The first peripheral module 7 also includes a receiver 7b for receiving a signal corresponding to the detected reflection of light representing the target symbol from the optical scan module 1 via cable 5. The signal may be in the form of an electrical signal generated by a photosensor or photodetector located in Module 1. Alternatively, if such component is located in the first peripheral module 7, the received signal is preferably an optical signal received via optical fiber running through cable 5. The photosensor or detector located in the first peripheral module 7 would thus detect the transmitted optical signal. Also included in peripheral 7 is a radio frequency (RF) or other wireless transmitter 7c which is used to transmit a signal corresponding to the detected reflection of light, i.e. representative of the target symbol, from the first peripheral module to a second peripheral module 9 which is located on the left arm or wrist of the user. The transmitter 7c could be a transceiver which is also capable of receiving signals from a second peripheral module 9 or base station 13.

The first peripheral module 7 is preferably mounted on the same side of the user's body as the optical scan module 1. Thus as shown, optical scan module 1 is mounted on a single finger of the right hand and the first peripheral module 7 is mounted on the right arm/wrist of the user. Depending on the user's preference, the various modules could be switched so that the optical scan module 1 and first peripheral module 7 are mounted on the left hand and arm/wrist and optionally, a second peripheral module 9 is mounted on the right arm/wrist.

The optical scan module and the first peripheral module may optionally include, either together with or in lieu of cable 5, a wireless transmitter 1a and wireless receiver 7d in combination with, or in lieu of, cable 5 for facilitating communications of the signal corresponding to the detected reflection of light from the targeted indicia.

The electrical or optical transmitted signal from optical scan module 1 to the first peripheral module 7 can be further transmitted, typically in a transformed state, via radio frequency transmitter 7c to a radio frequency receiver 9a of the second peripheral module 9 or the base station 13, or to a third peripheral device 11. If both transmissions are by a wireless link, the transmission frequencies will typically be different. The second peripheral module 9 includes digitizing and processing circuits 9b which convert the transmitted analog signal to a digital signal and decode the signal in the conventional manner. An indicator light, beeper or audio transducer 9c signals the user when the decoding has been satisfactorily accomplished. Such notice could also or alternatively be provided by information displayed on 9f. An indicator subsystem in accordance with the present invention is described below with reference to FIG. 16. The second peripheral module 7 also preferably includes a memory storage device 9h to temporarily store the decoded data. The second peripheral module may also have a radio frequency transmitter 9d to transmit decoded data to a base station 13, which could, for example, be a personal or other computing device. A keypad 9e and display 9f are also included as part of the second peripheral module. A touch screen could alternatively be used in lieu of the keypad and display. The keypad 9e is used for inputting data to the system and the display 9f is used to display the input data and decoded information. The input data can also be transmitted via the radio frequency transmitter 9d to, for example, the base station. A third peripheral device 11 is optionally provided for a power supply to power the second peripheral module and/or for a transceiver 11a for receiving and transmitting signals from and to the first peripheral module 7 and the base station 13. The power supply as shown is mounted to a belt worn by the user 3. Alternatively, a battery could be included as part of the second peripheral module 9.

Figure 3:
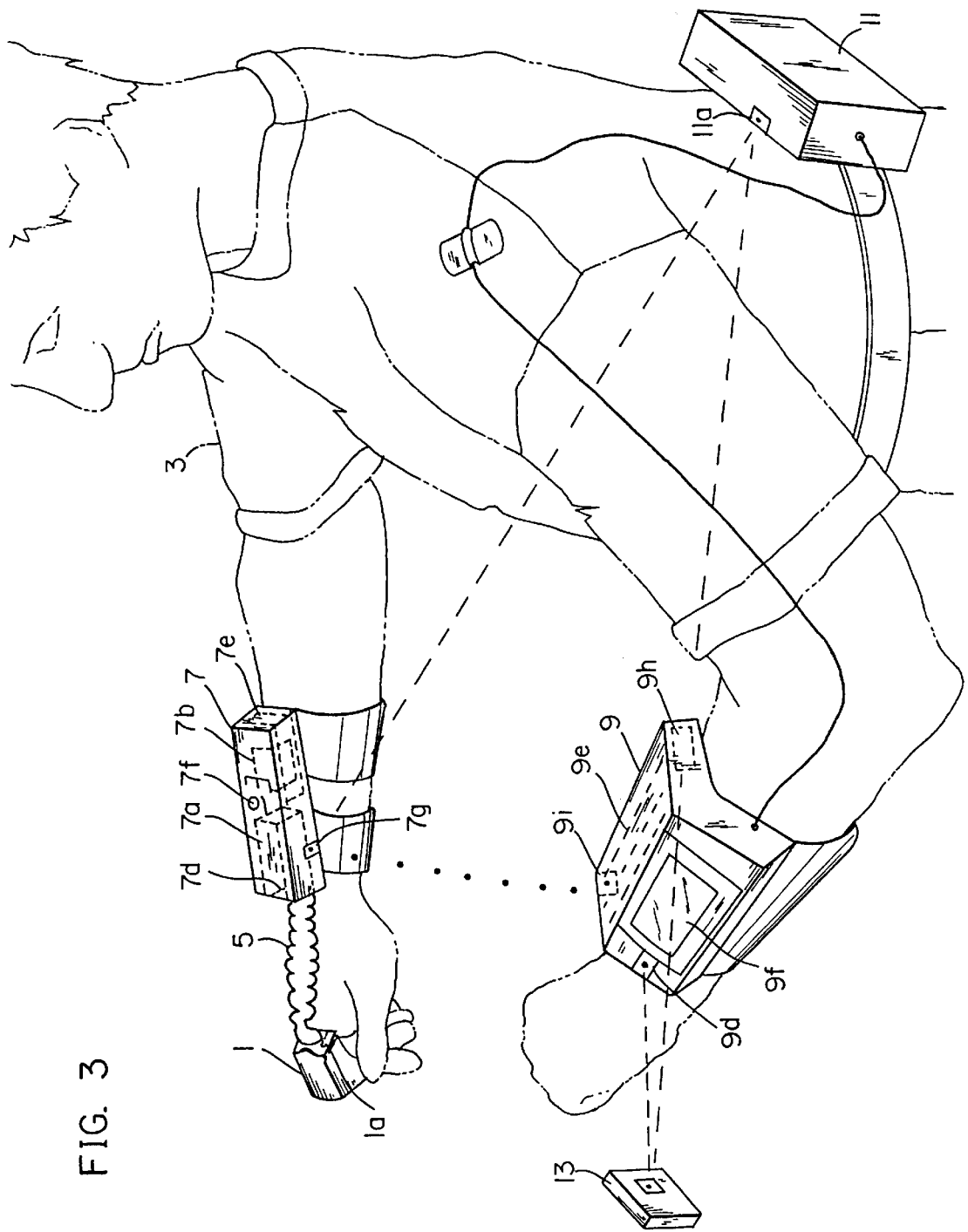
FIG. 3 depicts a second embodiment of the portable optical scanning system of the present invention.

In FIG. 3, a second embodiment of the portable optical scanner of the present invention is shown. This embodiment is similar to the embodiment of FIG. 2 and like components are designated with same numeric reference. In the FIG. 3 embodiment, the analog to digital conversion and decoding of the signal are performed by the processor 7e in the first peripheral module 7. The first peripheral module 7 also has an indicator light or beeper 7f which signals the user when the decoding has been satisfactorily performed. Thus, no processor and beeper is required in the second peripheral module 9. As in the above described embodiment, the second peripheral module includes an electronic storage device 9h for storing the decoded data. It will be understood that although keypad 9e and display 9f are shown, a touch screen could be easily substituted therefor in the conventional manner. Additionally, FIG. 3 shows a radio frequency transceiver 9i substituted for the receiver 9a of FIG. 2. The transceiver 9i is not only capable of receiving a radio frequency transmission from the first peripheral module but can also transmit data input via the keypad to the first peripheral module 7. Likewise, a radio frequency transceiver 7g is substituted for transmitter 7c in the first peripheral module so that it can receive the input data from as well as transmit the decoded information to the second peripheral module. Except as noted in the above, all components of the optical scanning system depicted in FIG. 3 are identical to those described with reference to FIG. 2 above.

In the FIG. 3 split scanner configuration, a transmitter 1a is provided in the optical scan module 1 and a receiver 7d is provided in the first peripheral module 7. In such a configuration, there is no feedback or two-way communications between the optical scan and first peripheral modules. Various manual methods could be used to turn on and off the light emitter of optical scan module 1 and/or processor 7e of first peripheral module 7. However, it is more advantageous for these components to be automatically activated and deactivated so as to reduce unnecessary power consumption without adding complexity to the efficient operation of the system. It is particularly desirable for the processor 7e to be activated only when necessary for decoding targeted indicia and for the light emitter to be deactivated once satisfactory decoding of the targeted indicia has been achieved.

To provide automatic activation/deactivation of the emitter and/or processor, the receiver 7d optionally includes object sensing circuitry such as that previously disclosed in, for example, U.S. Pat. Nos. 4,933,538 and 5,250,791 which are issued to the assignee of all rights in the present invention. A portion of the circuitry of receiver 7d, which consumes a relatively small amount of power from the power source 7a, is activated, either continually or periodically, whenever the portable optical scan system of FIG. 3 is activated by a trigger switch or other system activation mechanism of the type described previously. The object sensing circuitry checks for a received signal indicative of indicia of the type being targeted. If the check reveals that a received signal is representative of, for example, a bar code symbol of the desired type, the object sensing circuitry generates a signal to activate the remaining portion of the receiver 7d circuitry and the processor 7e. The fully activated receiver 7d transmits, to processor 7e, the received signal which represents the spatial intensity variation of the targeted symbol. The processor 7e then processes and decodes the signal from receiver 7d. Once the decoding has been completed, or after the expiration of a predetermined time period following full activation of the receiver 7d and processor 7e, a portion of the circuitry of the receiver 7d and the processor 7e are automatically deactivated and the object sensing circuitry again goes into a continuous or periodic checking mode to check for a received signal indicative of the desired type of indicia.

The light emitter and, if desired, the detector can be activated/deactivated by connection to a timeout circuit or an audio signal sensing means. In the former case, a conventional clock or timing circuit is connected to the light emitter and/or detector circuitry to automatically deactivate the light emitter and/or detector after a preset period of time has expired subsequent to the activation of the emitter and detector by the trigger switch or other system activation mechanism. For example, if the receiver/processor is capable of receiving and decoding one symbol per second, the clock circuitry may be beneficially set to automatically deactivate the light emitter and/or detector one second after activation to avoid a double read of the same symbol. If desired, the clock circuitry could be implemented so that timed deactivation does not occur when the operator has set a lock on the trigger switch; When the trigger switch is locked, the light emitter and detector remain in a continuously activated state, which may be preferable for certain operations. After deactivation, the emitter and/or detector are reactivated by, for example, releasing and resqueezing the trigger switch to rescan the same symbol, if satisfactory decoding has not been achieved, or to scan another symbol.

Alternatively, the emitter and/or detector are connected to a conventional audio sensor for sensing the audio signal produced by beeper 7f. Such sensors typically include an acoustic transducer and associated receiver circuitry, as is well understood in the art. The beeper 7f provides an audible indication of the satisfactory decoding of the scanned indicia. Upon sensing the beeper signal, the light emitter and/or detector are deactivated. After deactivation, the emitter and/or detector are reactivated by, for example, releasing and resqueezing the trigger switch to scan another symbol. Since deactivation using the audio sensor only occurs after confirmation of satisfactory decoding, reactivation to rescan a symbol is not required. If desired, the audio sensor can be implemented such that deactivation, based on reception of the beeper signal, does not occur when the operator has set a lock on the trigger switch.

Figure 4:
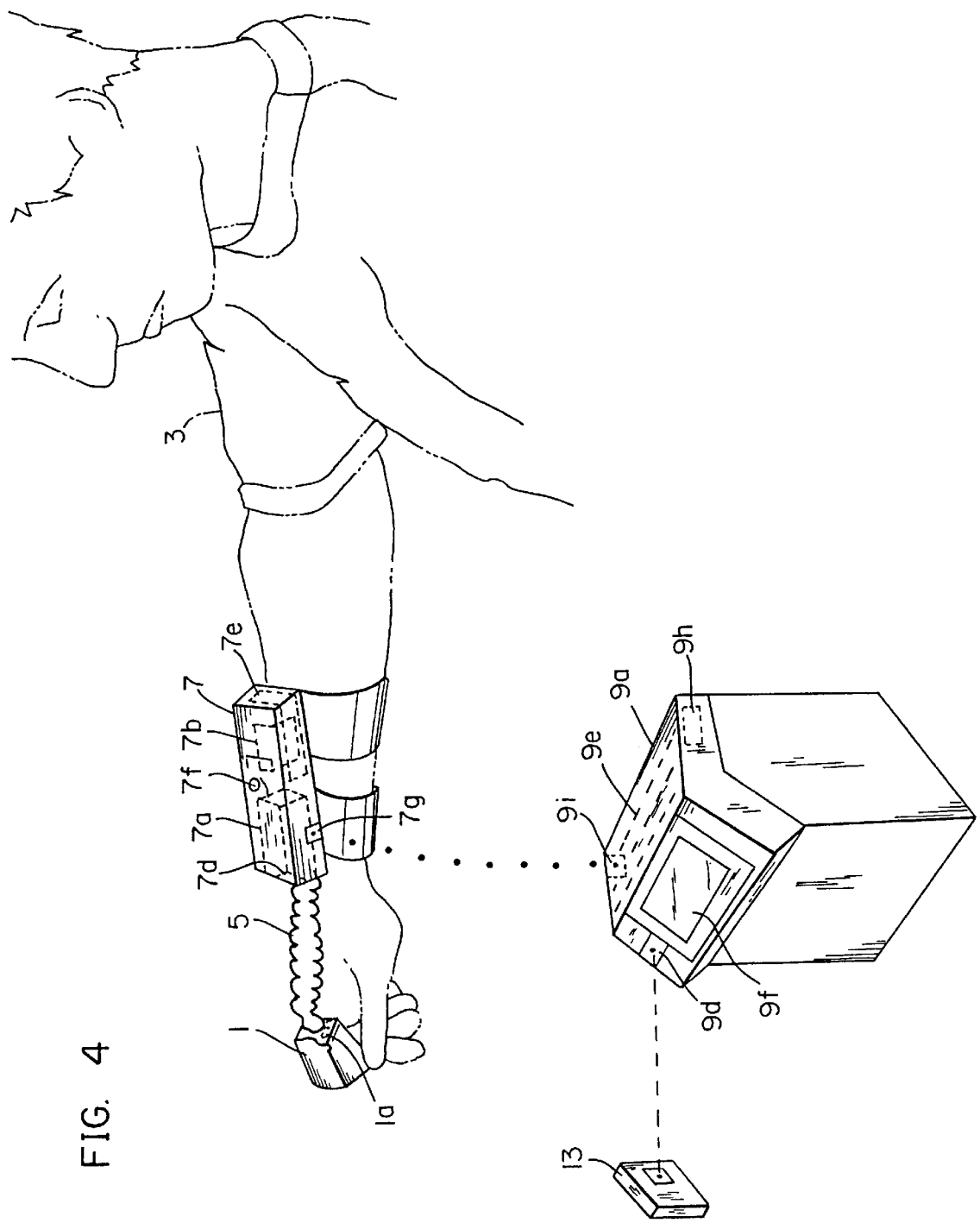
FIG. 4 depicts the portable optical scanning system similar to that shown in FIG. 3 with a touch screen.

FIG. 4 shows an optical scan system similar to that shown in FIG. 3 except that the second peripheral module 90 is located 25 to 150 feet from, rather than mounted on, the user. Although this specific range is preferred, it should be understood that implementation is not limited to this or any other specific transmission ranges.

Figure 5:
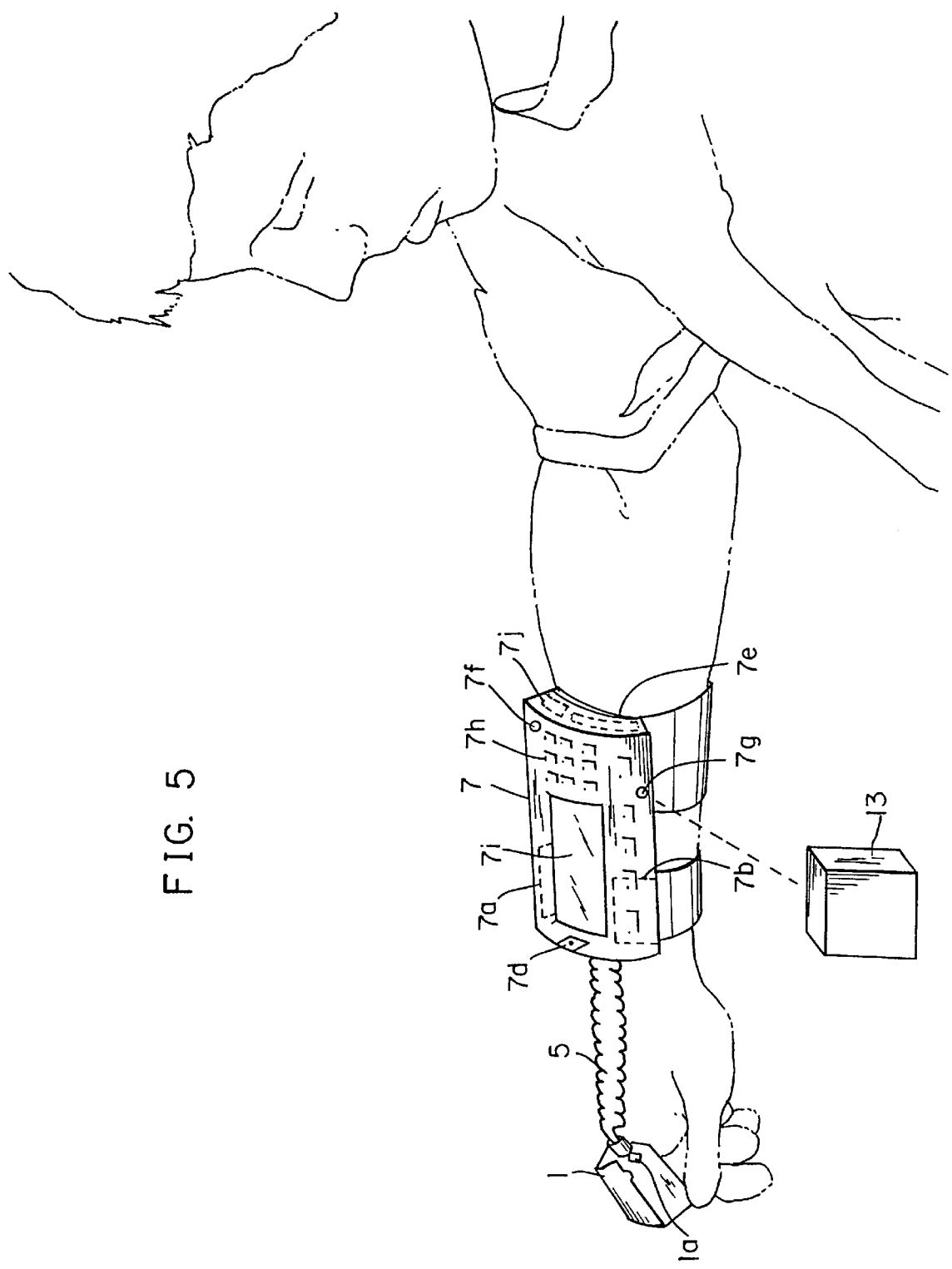
FIG. 5 depicts a portable optical scanning system in accordance with a third embodiment of the invention.
Figure 6:
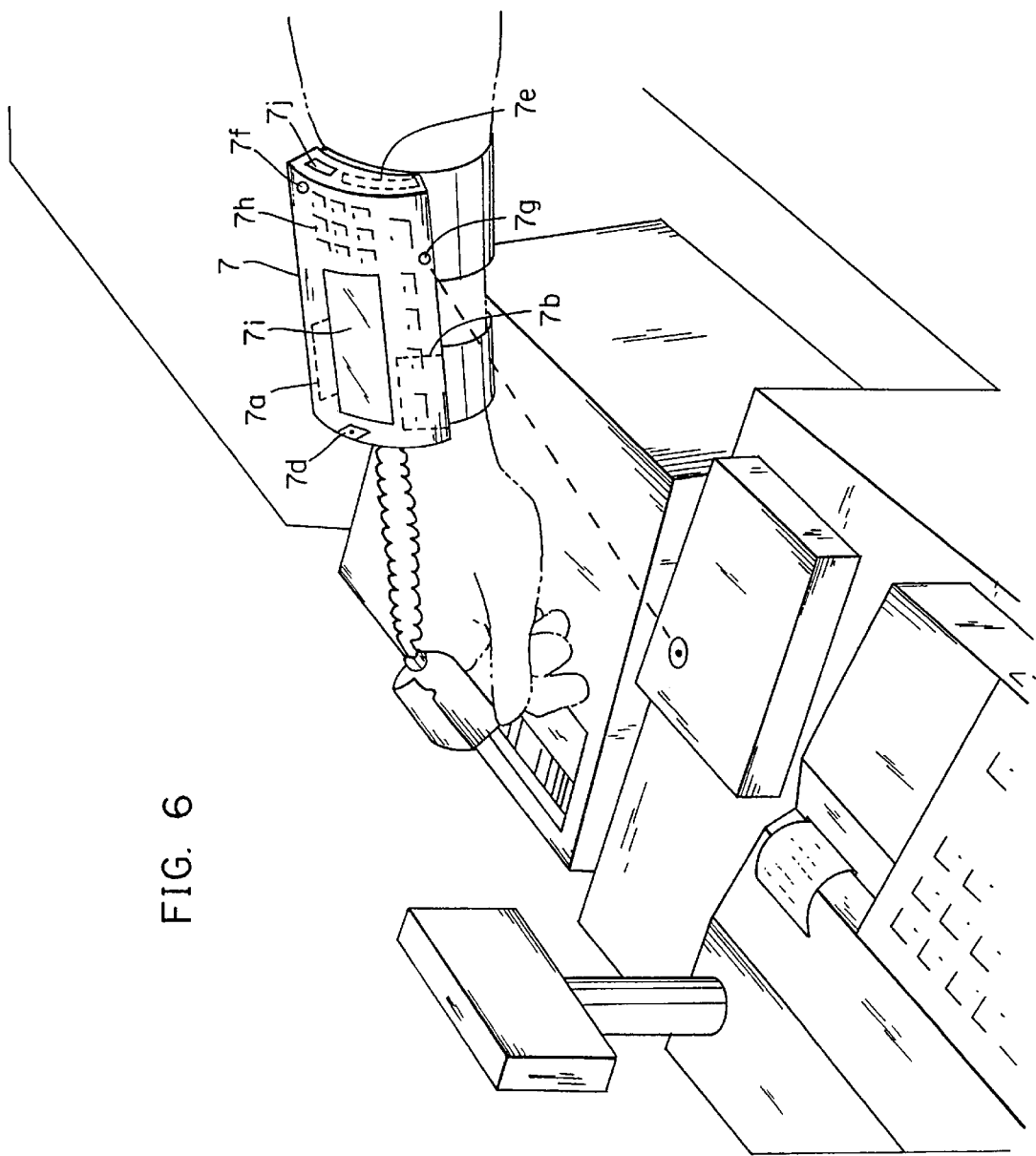
FIG. 6 depicts the portable optical scanning system of FIG. 5 used in a practical application.
Figure 7:
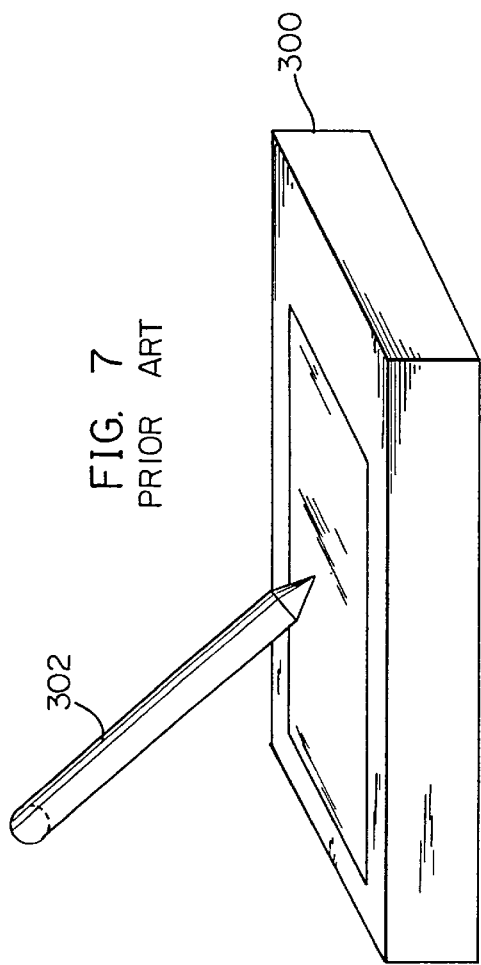
FIG. 7 depicts a conventional pen computer.
Figure 8:
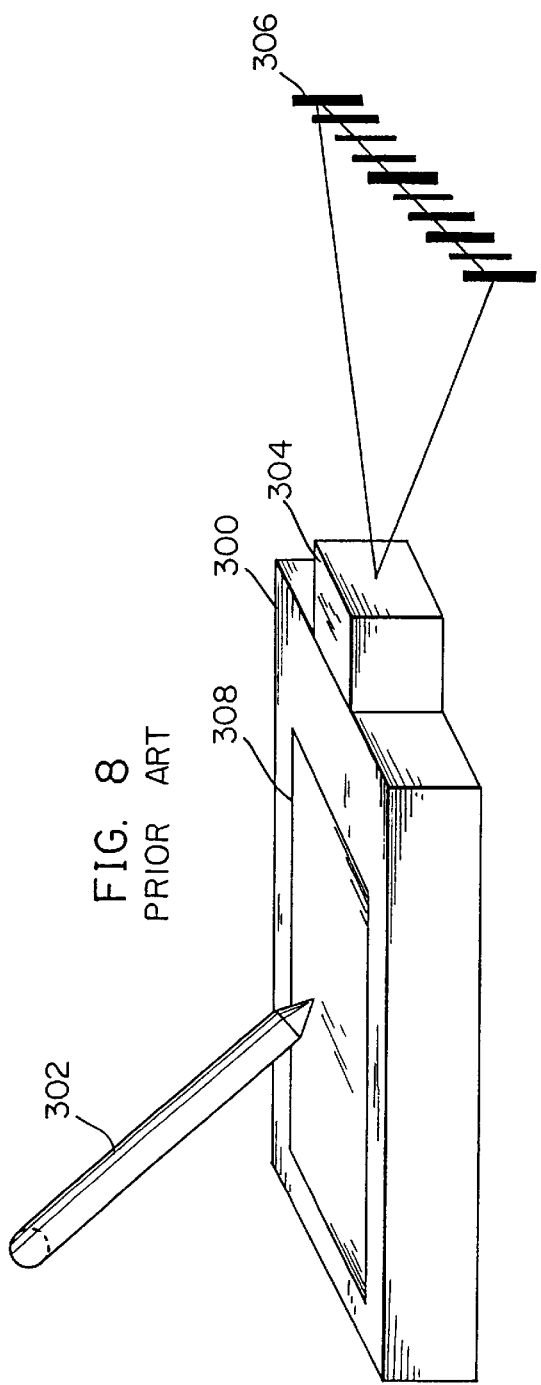
FIG. 8 depicts a conventional pen computer with a scanner module.
Figure 9:
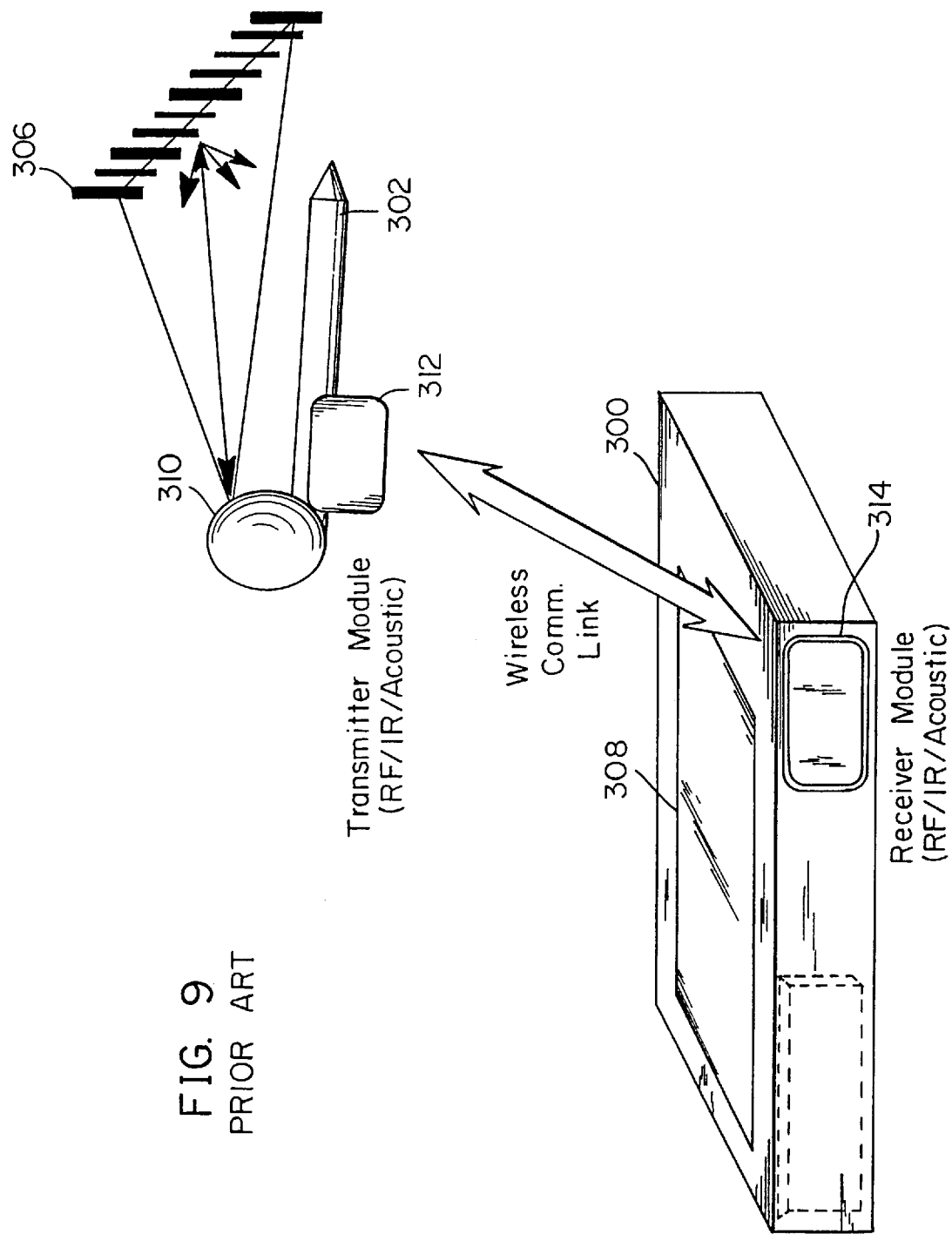
FIG. 9 depicts a conventional pen scan module and computer with wireless communication links.

FIG. 5 shows still another embodiment of the invention. In this embodiment, the first peripheral module- includes all of the components described in connection with FIG. 4 and additionally includes a keypad 7h and display 7i. As noted above, a touch screen can be substituted in the conventional manner for the keypad 7h and display 7i. Additionally, electronic memory storage 7j is included in the second peripheral module for storage of the decoded data. The second peripheral device is completely unnecessary. Base station 13 is preferably located between 25 and 150 feet from the user.

FIG. 10 shows a pen computer optical scanning system in accordance with the present invention. The pen 302 includes a light emitting module 320 which generates and directs light towards the indicia 306 to be read. The module includes components of the type described above in connection with the other embodiments of the invention. The computer module 300 includes a detector 322 which detects reflected light from the target indicia. The detector 322 can be a photodiode or sensor, such as a charge coupled or other solid state imaging device. The optical scan module 320 can be similar to that shown in FIG. 3B of U.S. patent application Ser. No. 08/068,025. The processing of the detected reflection of light could, as is conventional, be performed within computer module 300. FIG. 11 shows a further configuration of the computer module 300. In this configuration, the computer module has multiple detectors 322 to allow greater flexibility in the positioning of computer module 300 during scanning operations. The computer module 300 has a processor 324 which includes an analog to digital converter, and/or decoding circuitry and software. The computer module also includes an indicator light or buzzer 326 for signalling the user when the decoding has been successfully accomplished. An electronic data storage diode is also included in the computer module. A keypad display and display (not shown) or touch screen 308 is located on a face of the computer module for inputting data and displaying the decoded information. A receiver which together with the transmitter forms a transceiver 328 is also included in the computer module so that data can be received from and sent to the base station or other peripheral modules (not shown). The transceiver 328 can be of a radio frequency, acoustic or infrared type depending on the application and preferably operates in the range of 25 to 150 feet.

Figure 12:
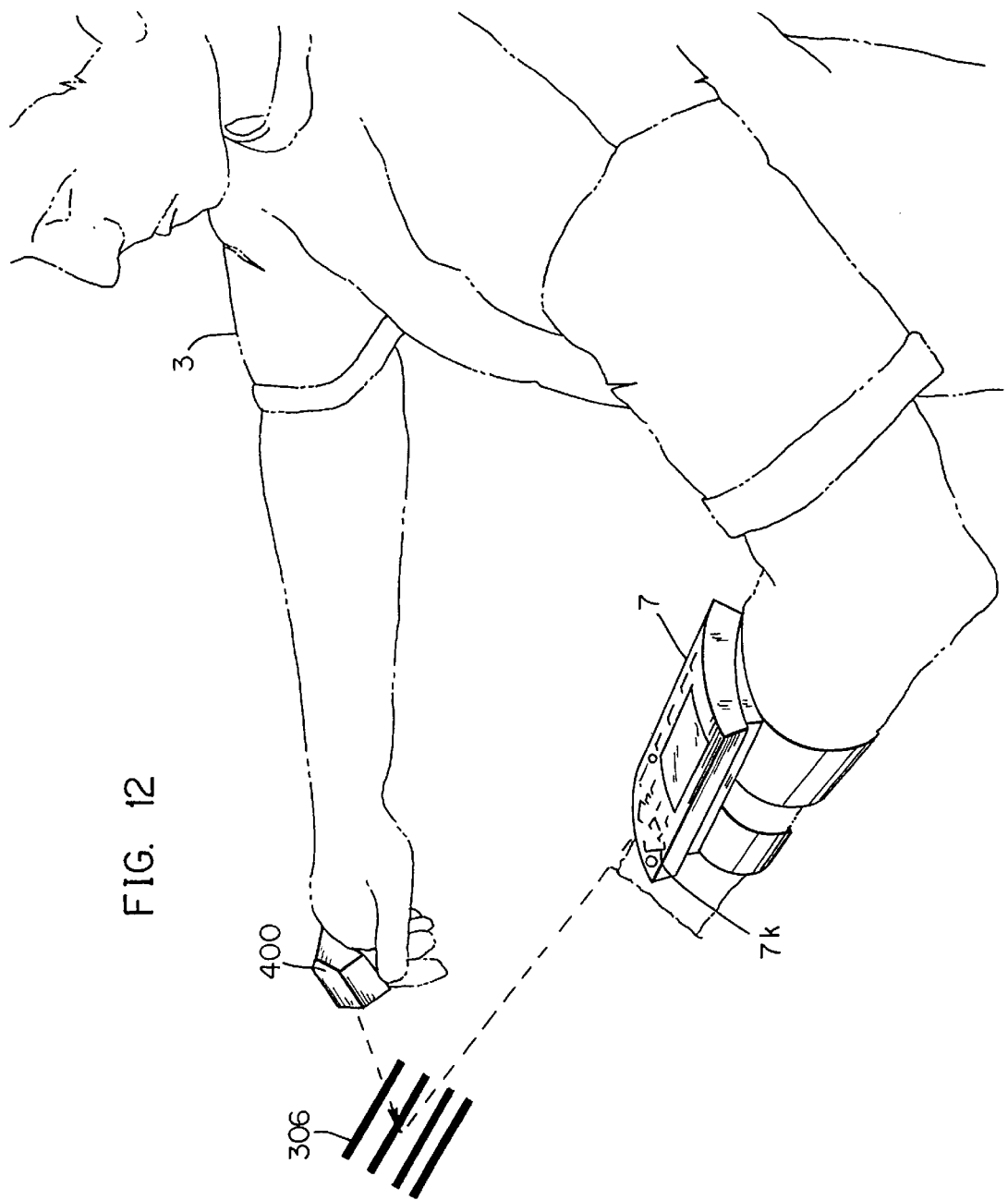
FIG. 12 depicts a ring scanner and arm/wrist mounted peripheral module according to a fifth embodiment of the present invention.

FIG. 12 depicts a further embodiment of the invention wherein the optical scan module 400 is mounted on a single finger ring. The module 400 includes a light emitter similar to that used in the pen computer scanners described above with reference to FIGS. 10 and 11. The light emitter generates and directs light towards the indicia 306 to be read. The peripheral module 7 mounted on a wrist or arm of the user preferably on the side of the user opposite that of the hand on which the optical scan module 400 is mounted. The peripheral module 7 is identical to that described with reference to FIG. 5, except as will be hereafter noted.

Peripheral module 7 includes a detector 7k which detects reflected light from the target indicia 306. Because the reflected light is directly detected by module 7k, wireless receiver 7d is unnecessary and has been eliminated in this embodiment. The optical scan module 400 can be similar to that shown in FIG. 12 of U.S. patent application Ser. No. 07/884,734. The detector 7k can be a photodetector or sensor, such as a charge coupled or other solid state imaging device.

The processing of the detected reflection of light would conventionally be performed as described above with reference to module 7. Thus, the peripheral module has a processor which includes an analog to digital converter, and decoding circuitry and/or software. The peripheral module also includes an indicator light or buzzer for signalling the user when the decoding has been successfully accomplished. An electronic data storage device is also included in the peripheral module.

A keypad and display or touch screen (not shown) is located on a face of the peripheral module for inputting data and displaying the decoded information. A receiver which together with the transmitter forms a transceiver is also included in the module 7 so that data can be received from the base station or other peripheral modules (not shown). The transceiver can be of a radio frequency, acoustic or infrared type depending on the application and preferably operates in the range of 25 to 150 feet.

Figure 13A:
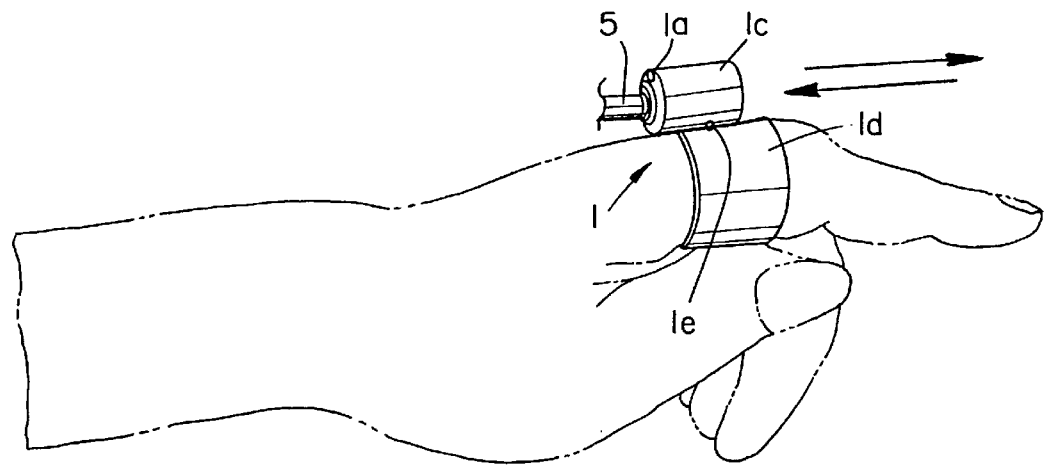
FIGS. 13A and 13B depict a single finger ring having a mount suitable for use in the embodiment of FIGS. 2, 3, 5 and 12.
Figure 13B:
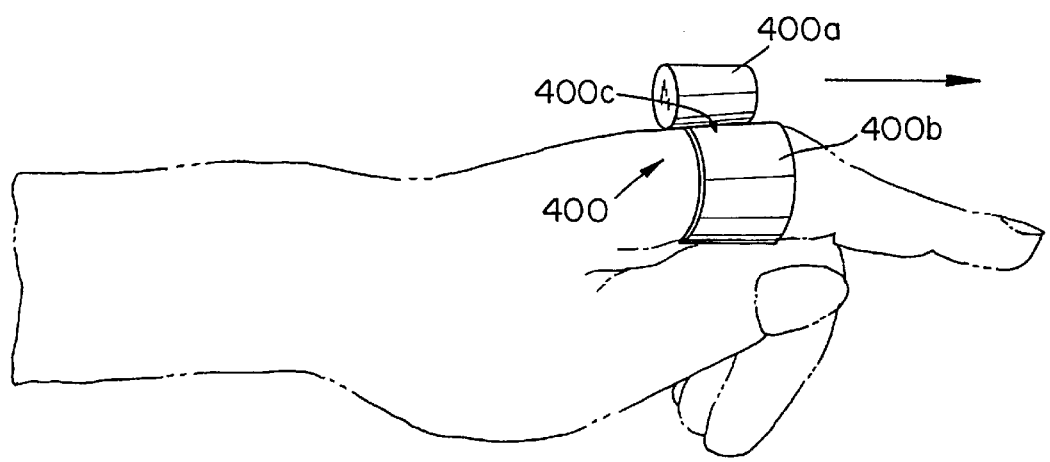

FIGS. 13 and 13A show a single finger ring housing and mount suitable for use in the embodiments of FIGS. 2, 3, 5 and 12. More particularly, FIG. 13A depicts a housing and mount which is particularly adapted for use in the embodiments of FIGS. 2, 3 and 5, while FIG. 13B depicts a housing and mount adapted for use in the FIG. 12 embodiment.

Referring now to FIG. 13A, the scan module 1 is connected to cable 5 and optionally includes a wireless transmitter 1a as described above. The scan module housing 1c is attached to a single finger ring mounting 1d. Scanner housing 1c is cylindrical in form, with smooth outer surfaces. The ring portion 1d is also cylindrical in form with smooth outer surfaces. The cylindrical single finger ring mount 1d is attached to the cylindrical housing 1a by means of a pivotal joint 1c. The pivotal joint allows cylindrical housing 1c to be rotated about the pivotal connection 1e so that light is emitted in directions other than the natural pointing direction of the finger on which the assembly is mounted. Thus, for example, housing 1c could be rotated 90° in either direction so as to emit a light beam above the user's thumb or the back of the user's hand, as applicable. The rotation is not limited to 90° but can be any angle which the user deems appropriate under the circumstances.

The pivot connection can, for example, include a plastic bearing or pivot shaft structure which allows movement of the housing only when a physical force is applied, preferably applied by the user's free hand, to the housing 1c. It will be recognized by those in the art that, if desired, the pivot connection could be adapted to allow rotation both in a plane approximately parallel to a plane formed by the back of the user's extended hand, i.e. with fingers extended, as well as limited rotation in another plane approximately perpendicular to the plane formed by the back of the user's extended hand.

FIG. 13B depicts a housing and mount configuration, similar to that of 13A, but which houses only the light emitter. The arrangement of FIG. 13B is particularly suitable for use in the embodiment of FIG. 12, wherein the detection of reflected light off the indicia is performed by a separate unit. Housing 400A and ring 400B are cylindrical with smooth outer surfaces. Rotational connection 400C is identical to connection le of FIG. 13A and serves an identical function. Connection 400C could likewise be modified to provide rotation in multiple planes as described above.

FIG. 14 depicts a retractable cable reel which may be utilized in the FIGS. 2, 3 and 5 embodiments. As shown in FIG. 14, a non-coiled flexible cable 5a has one end fixed or removably mounted to the optical scan module 1. If removably mounted, one end of the cable 5a is connected to a conventional plug-in-socket 1b in the scan module 1. In either case, the other end the cable 5a is retractably mounted to module 7 using reel 7n. Reel 7n is spring loaded. In one configuration, the spring is designed, using conventional techniques, to provide a constant tension force on the cable which is resisted by the user's finger during operation. The constant tension force ensures that there is no slack in the cable during operation and also provides the force necessary to retract the cable onto the reel when the system is not in use. If cable 5a is removably connected to scan module 1 the constant tension force must necessarily be less than a force which would disconnect cable 5a from socket 1b. The constant tension force applied by the spring must also be small enough so as not to make the use and operation of the system uncomfortable for the user.

Alternatively, the spring loaded reel could include a positional locking mechanism. Such mechanisms are commonly incorporated, for example, in the retraction reel used for various commercially available electrical devices such as vacuum cleaners, power hedge trimmers and the like. If such a locking mechanism is utilized, sufficient cable is pulled from the reel to allow comfortable operation by the user. A small amount of slack in the cable is present during operation but there is no tension on the cable which must be resisted by the users finger. When scanning operations are completed, the user simply uses a free hand to sufficiently tension the cable, or to move a lock release mechanism, to release the lock. Once the lock is released, the spring automatically provides the necessary force to cause the cable to be rewound on the reel. Spring loaded cable reels have been described in, for example, U.S. Pat. No. 3,657,491.

The cable opening in module 7a is sized to be large enough to allow for the extension and retraction of the cable. The cable opening is smaller than the scan module 1 housing or, in the case of cable which is removably connected to scan module 1, the connector portion of the cable which plugs into socket 1b so as to provide a stop during retraction. Rather than using a spring loaded reel, a motorized reel, similar to that used in a camera with a power film advance and rewind function or described in, for example, U.S. Pat. No. 4,842,108, or a manual spool, similar to that used in a fishing reel or camera without power film winding, could be adapted and used in a scanning system of the type described herein.

Figure 15A:
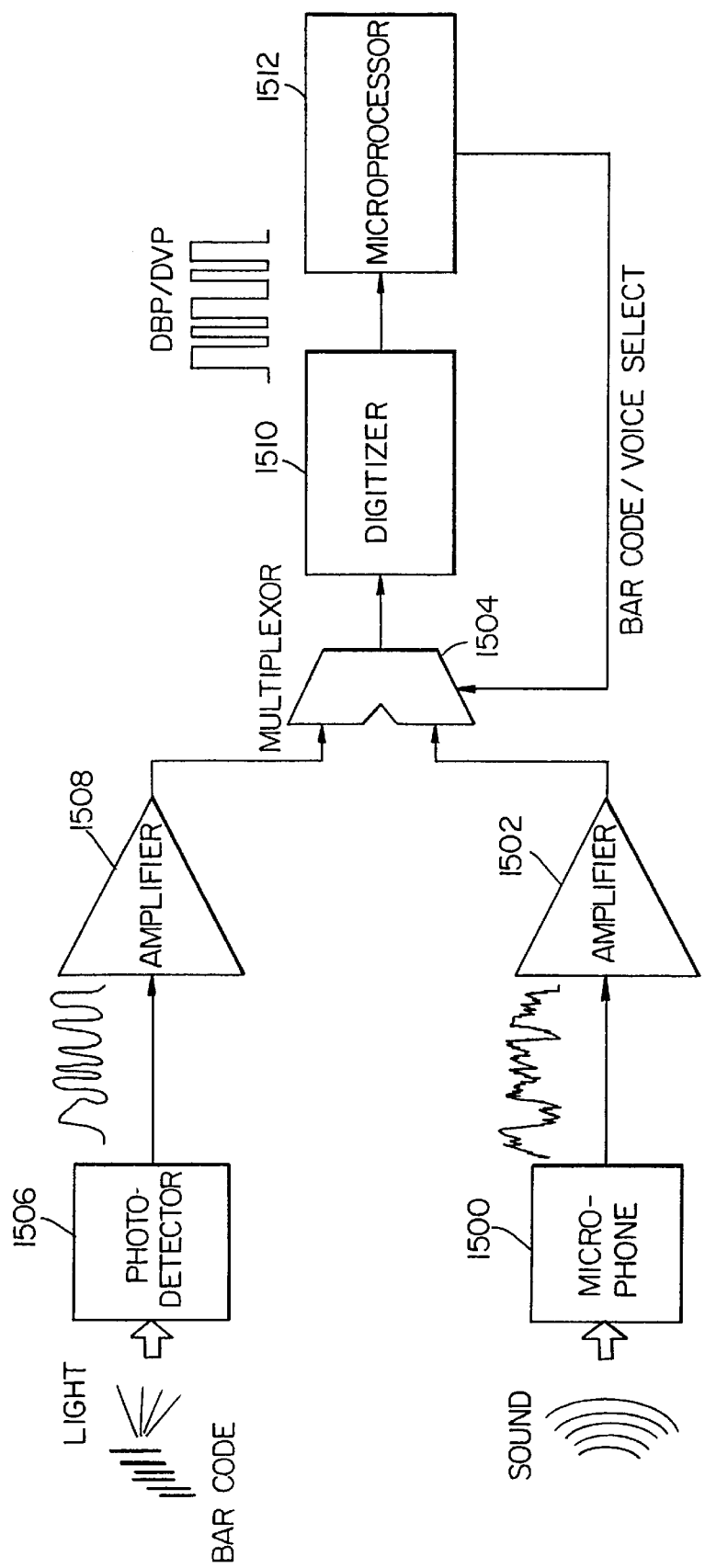
FIGS. 15A and 15B are block diagrams of voice recognition subsystems suitable for use in any of the embodiments of the invention described above.
Figure 15B:
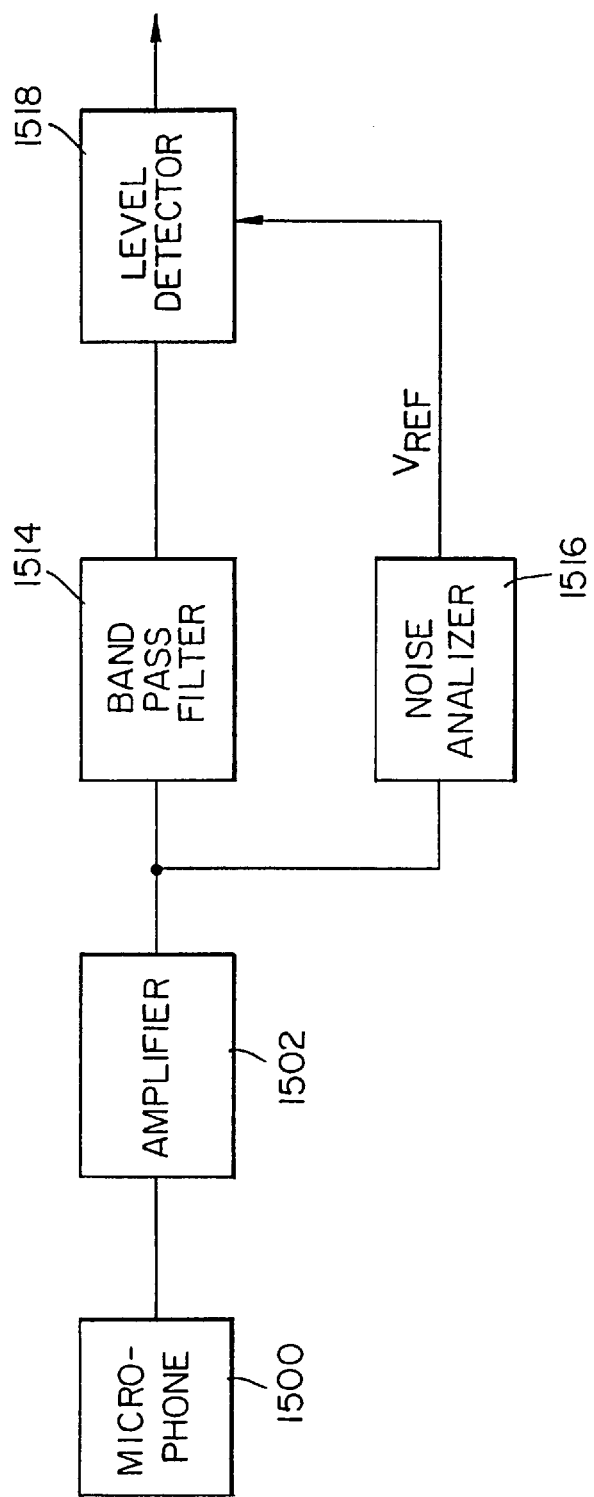

FIGS. 15A and 15B are block diagrams of two alternative voice recognition subsystems of the present invention which may be utilized in any of the described embodiments of the portable optical and pen computer scan systems to facilitate activation of the scan/read, signal processing, data entry, data display and/or signal transmission elements by the user. The subsystems may also be used, if desired, to identify the current user, change the operating modes of system elements and provide a data entry capability additional to, or in substitution for, the keypad or touch screen described above.

Referring to FIG. 15A, a microphone 1500, which is customarily mounted to the a headband, helmet or glasses worn by the user but could be mounted using conventional techniques to the mouth, throat, ear or clothing of the user, detects a voice command, such as "GO", from a user. The microphone transmits a clear, identifiable analog spectrum response signal, corresponding to the voice command, to the amplifier 1502 which may be housed together with or separate from microphone 1500. The analog response signal is independent of the user's voice characteristics, such as those reflective of the user's age, sex or accent. The analog response signal is amplified in amplifier 1502. The amplified response signal is transmitted via wire or wireless communications link to multiplexer 1504 which is preferably housed in module 7 or 300 of the previously described embodiments.

Such commanding can occur simultaneous with scanning operations. In such cases, an analog read signal, corresponding to the detected reflected light from, for example, a bar code is simultaneously being transmitted by photodetector 1506 to amplifier 1508, amplified by amplifier 1508, and transmitted to multiplexer 1504. The analog signals from the amplifiers 1502 and 1508 are multiplexed in multiplexer 1504 and the multiplexed analog signal transmitted to digitizer circuit 1510. The multiplexed analog signal is converted in digitizer circuit 1510 into a digital pulse signal stream. The width of the each digital pulse signal represents either the bar/space transitions of the bar code or an inflection point in the voice response signal.

The system microprocessor 1512, which includes the previously described processing circuitry used to process the signals generated by the system sensor or photodetector, preferably controls the multiplexer and adjusts the operating parameters, e.g. the sensitivity, of the digitizer circuitry to optimize the circuitry for conversion of the multiplexed voice response and read signals. By counting the number of transitions in a given time period, the microprocessor 1512 determines the frequency of the voice response signal within the selected time period.

The microprocessor then applies the voice response signal frequency measurement to a recognition algorithm, stored for example in the microprocessor's or a separate memory device, and activates the scan/read, signal processing, data entry, data display and/or signal transmission elements, or changes the operating mode of one or more of the elements depending on the results. For example, the operating mode or parameters of the scan/read elements may be adjusted based upon the distance to or density of the target, or the processing circuitry may be activated to download or total data, or the current user may be identified in accordance with the voice command recognized by the algorithm. Alternatively, the voice command may include data to be entered to the system which is recognized by the recognition algorithm and entered on the system as previously discussed but without using the keypad or touch screen.

FIG. 15B depicts a block diagram of a second voice recognition subsystem which is somewhat simpler than that of FIG. 15A and is primary useful in activating and/or deactivation the scan/read elements. Microphone 1500 and amplifier 1502 are identical to those described with reference to FIG. 15A above. The amplified analog voice response signal is transmitted to a band pass filter with a predetermined passband frequency range. The amplified analog voice response signal is also transmitted simultaneously to noise analyzer 1516 which analyses the signal for background noise and transmits a signal corresponding to the results of the analysis to the level detector 1518. The detector 1518 threshold parameters are automatically adjusted for the background noise level based upon the transmitted results of the analysis. The magnitude of the filtered signal is then compared to the adjusted threshold parameters and based upon this comparison a signal is generated and transmitted by the detector 1518 to activate or deactivate the scan/read elements.

FIG. 16A is a block diagram of a indicator subsystem in accordance with the present invention and FIG. 16B is a list of status/conditions of which the user can be notified using the indicator subsystem. The indicator subsystem is suitable for use in any of the embodiments of the portable optical and pen computer scan systems described herein.

Referring to FIG. 16A, the system microprocessor 1600 is connected to an interface 1602 which is in turn connected to the optical scan element. The system microprocessor 1600 is also connected to a second interface 1604 which is in turn connected to those other elements of the system whose status and/or condition is of interest to the user. Such elements will typically include, for example, the photodetector or sensor, the decoder, the battery or any other element regarding which status or condition information is required. FIG. 16B is an exemplary list of some of the items normally of interest to the user. It will be understood by those skilled in the art that the list is provided, not as a comprehensive listing of status and condition items of interest since such items are well-known in the art. Rather the list is provided simply to indicate the types of status and condition items under discussion.

Information received from the elements to which the interfaces are connected is received via the interfaces by the processor 1600 and compared to threshold information stored in and retrieved from the processor's or a separate memory device 1606. If desired, the information can also be stored in the memory 1606. Based upon the comparison, the processor can generate and transmit a signal to the system display 1608 which results in a multiple digit numeric, alpha-numeric or graphic display of information representing the status and/or condition of one or more elements of the system.

Additionally or alternatively, the processor 1600 transmits the generated signal to a sound generator circuit 1610, which optionally includes a synthesizer. Sound generator circuit 1610 applies the received signal to a recognition algorithm, stored for example in the memory 1606, and generates and transmits a signal to audio transducer 1612 reflective of the received signal. The transducer 1612, which is preferably a high-grade, micro audio-speaker, is driven by the signal from the sound generating circuit to produce an audible synthesized or tone sound which provides the user with information representing the status and/or condition of one or more elements of the system.

With regard to FIG. 16B, the designations used should be clear to those skilled in the art. However, to avoid any possible questions which may arise as to the meaning of certain of the listed designations, "1-D decoder" refers to a single dimension bar code decoder, "macro PDF decoder" refers to a specific subset within the PDF-417 symbology type, "heap space" refers to a portion of memory, "ADF rule" refers to advance data formatting rules, and "PDF optional field" refers to an area within the PDF symbol reserved for optical encoding of special data. It should also be understood that the list of status/conditions is, exemplary in nature, since the status and condition indications required or desired are well understood in the art.

FIGS. 17A–17D depict alternative mountings for the optical scan module of the embodiments of FIGS. 2, 3, 5 and 12 and for the microphone/amplifier of FIGS. 15A and 15B. Using any of the FIG. 17A–17D arrangements, aiming is done by movement of the user's head.

Figures 17A, 17B:
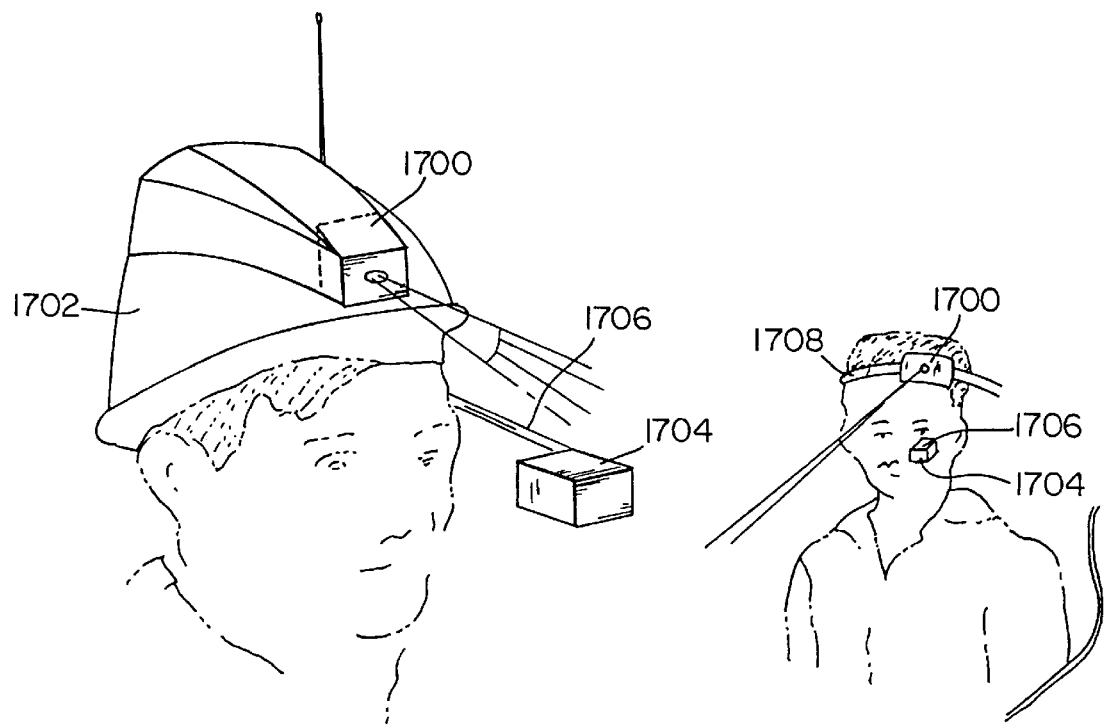
FIGS. 17A–17D depict alternative mountings for the optical scan modules of the embodiments of FIGS. 2, 3, 5 and 12.

In FIG. 17A the scan module 1700, which is identical to module 1 of FIGS. 2, 3 and 5 or 400 of FIG. 12 is mounted in helmet 1702. A microphone/amplifier assembly 1704, which preferably includes the microphone and amplifier, 1500 and 1502 of FIGS. 15A and B, is mounted from a support member 1706 which is attached to helmet 1702. Support member 1706 may be either of plastic or metal and is preferably deformable so that a user can, by bending member 1706 in an appropriate direction or directions, adjust the location of assembly 1704 to a comfortable position in the general proximity of the user's mouth and outside the user's line of sight and the scan module field of view.

FIG. 17B depicts a support arrangement similar to that of FIG. 17A, with all like elements designated with reference numerals identical to those of FIG. 17A. The primary difference between FIG. 17A and 17B is that the optical module 1700 is supported in FIG. 17B by an adjustable headband 1708. The headband may be made of flexible elastic material or may have a buckle or other means for adjusting the headband to the size of the user's head so that the optical module 1700 and assembly 1704 are comfortably supported during operation of the system by the user. The optical module 1700 and support member 1706 are attached to the headband 1708 in a removable manner using any conventional technique which does not make the wearing of the headband uncomfortable to the user. It will be noted that optical module is positioned over one of the user's eyes which some user's find to be the preferable positioning for aiming purposes.

Figures 17C, 17D:
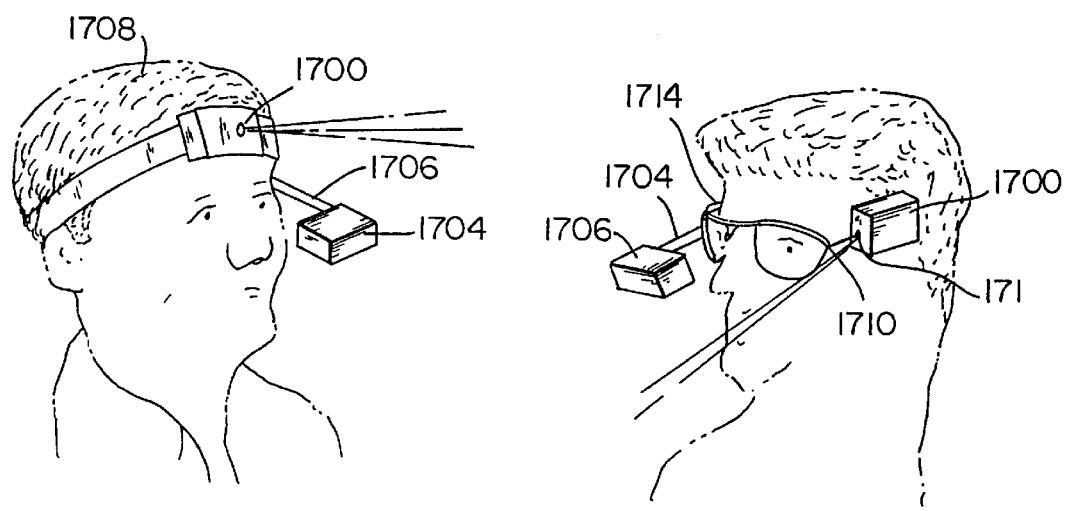
Figure 18A:
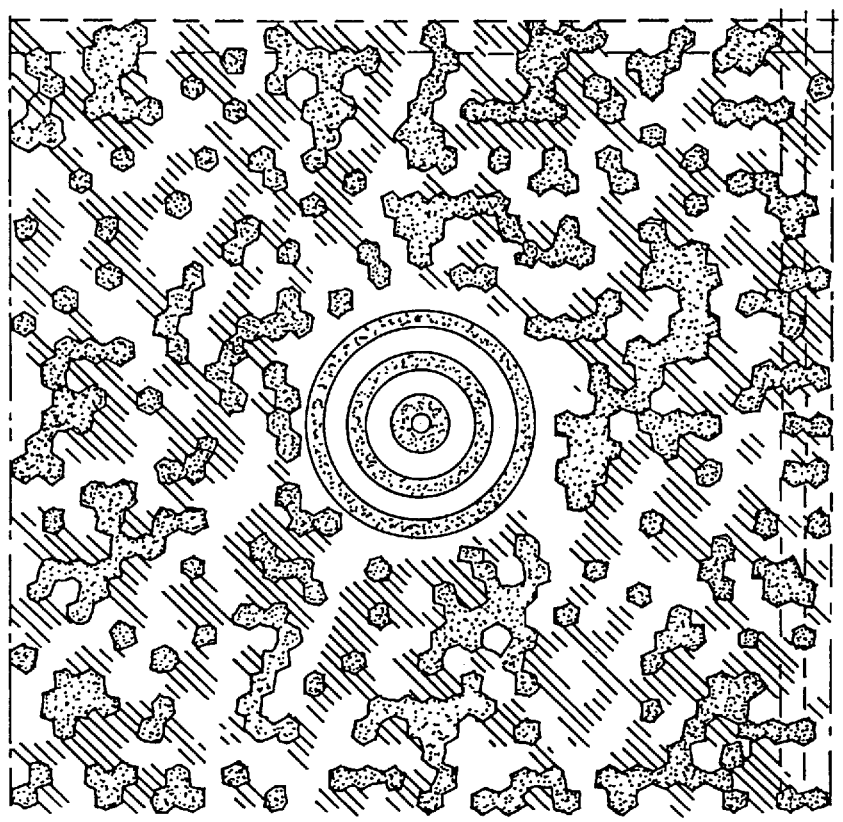
FIG. 18A–18C depict symbols conforming to various prior art symbologies.
Figure 18B:
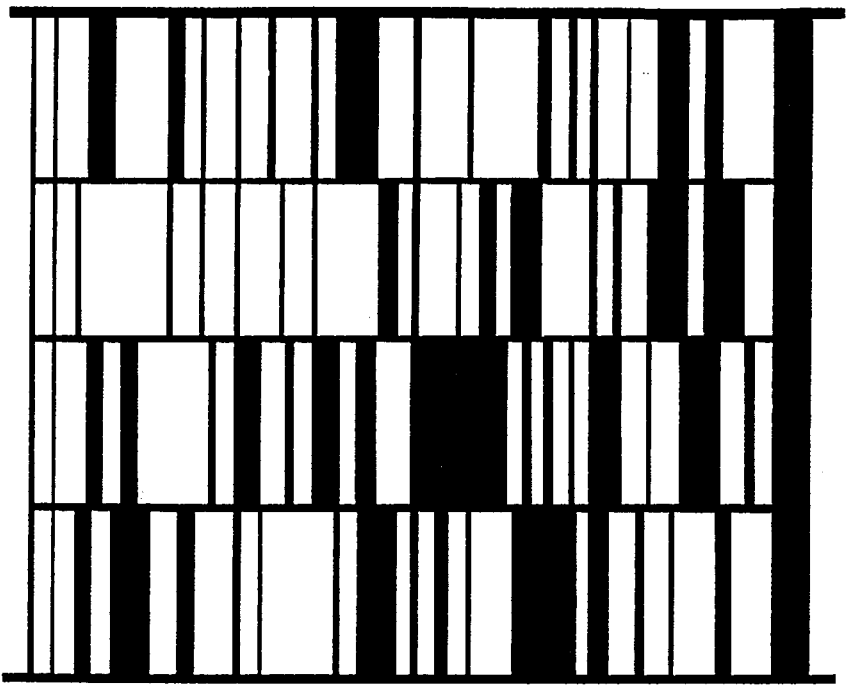
Figure 18C:
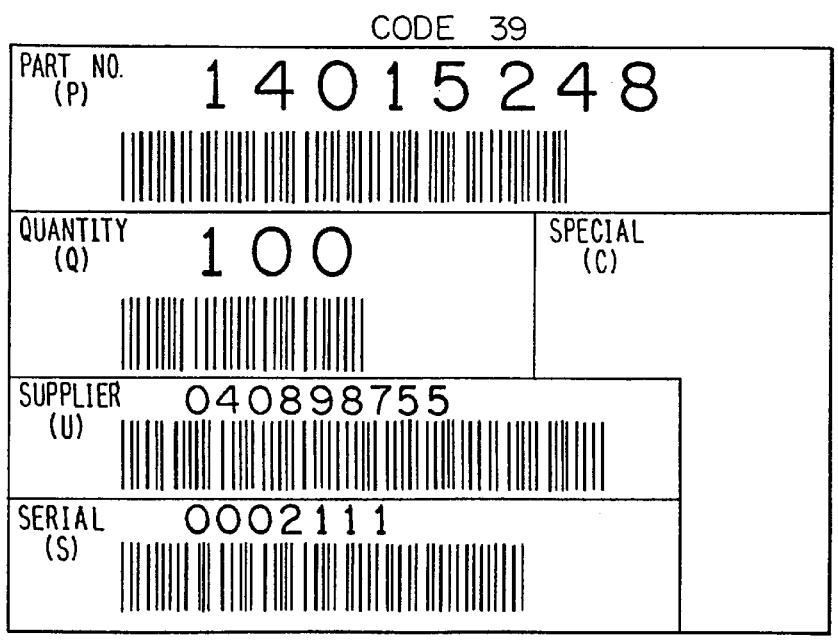

The support arrangement of FIG. 17C is identical to that of FIG. 17B, except in FIG. 17C the optical module 1700 is positioned to be centered between the user's eyes. This positioning of the optical module 1700 is found, by some user's, preferable for aiming and from a comfort of use viewpoint.

FIG. 17D depicts still another arrangement wherein the optical module 1700 and support member 1706 are attached to an eye glass frame 1710. This arrangement is particularly suitable where the system is being used in areas where safety glasses are required or for user's who normally wear eye glasses.

All of the disclosed embodiments with radio frequency communications capabilities preferably operate for usages in the United States in a range of 902 to 928 MHz, or 2.4 GHz, and for European applications at approximately 433.9 MHz. Other frequencies would be used elsewhere depending on the applicable governmental regulations for radio frequency transmissions. Additionally, all of the transceivers may optionally include a modem with an RF 232 interface for facilitating communications with the base station or other peripheral items. The RF transceivers also include filters on the receive side to filter receive signals.

Although certain embodiments of the invention have been discussed without reference to the scanner housing, triggering mechanism and other features of conventional scanners, it will be understood that a variety of housing styles and shapes and triggering mechanisms could be used. Other conventional features can also be included if so desired. The invention is directed primarily to a portable hand-held scanning device and thus is preferably implemented using miniaturized components such as those described in the materials referenced herein, or otherwise known in the art. However, the scanner of the present invention is not limited to use in portable devices and can also be easily adapted for use in a stationary housing wherein the item on which the symbol resides is moved across the scanner head.

Additionally, even though the present invention has been described with respect to reading one or two dimensional bar code and matrix array symbols, it is not limited to such embodiments, but may also be applicable to more complex indicia scanning or data acquisition applications. It is conceivable that the method of the present invention may also find application for use with various machine vision or optical character recognition applications in which information is derived from indicia such as printed characters or symbols, or from the surface or configurational characteristics of the article being scanned.

In all of the various embodiments, the elements of the scanner may be implemented in a very compact assembly or package such as a single printed circuit board or integral module. Such a board or module can interchangeably be used as the dedicated scanning element for a variety of different operating modalities and types of data acquisition systems. For example, the module may be alternately used in a hand-held manner, a table top scanner attached to a flexible arm or mounting extending over the surface of the table or attached to the underside of the table top, or mounted as a subcomponent or subassembly of a more sophisticated data acquisition system.

Each of these different implementations is associated with a different modality of reading bar code or other symbols. Thus, for example, the hand-held scanner is typically operated by the user "aiming" the scanner at the target; the table top scanner operated by the target moved rapidly through the scan field, or "presented" to a scan pattern which is imaged on a background surface. Still other modalities within the scope of the present invention envision the articles being moved past a plurality of scan modules oriented in different directions so at least the field of view allows one scan of a symbol which may be arbitrarily positioned on the article.

The module would advantageously comprise an optics subassembly mounted on a support, and a photodetector component. Control or data lines associated with such components may be connected to an electrical connector mounted on the edge or external surface of the module to enable the module to be electrically connected to a mating connector associated with other elements of the data acquisition system.

An individual module may have specific scanning or decoding characteristics associated with it, e.g. operability at a certain working distance, or operability with one or more specific symbologies or printing densities. The characteristics may also be defined through the manual setting of control switches associated with the module. The user may also adapt the data acquisition system to scan different types of articles or the system may be adapted for different applications by interchanging modules in the data acquisition system through the use of a simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local or wide area network or with the telephone exchange network, either through a modem or an ISDN interface, or by low power radio broadcast from a portable terminal to a stationary receiver.

It will be understood that each of the features described above, or two or more together, may find a useful application in other types of scanners and readers differing from the types described above.

We claim:

1. A status/condition indicating arrangement for use in an electro-optical system having components, including a photodetector and a decoder, for reading indicia having parts of differing light reflectivity, comprising:
    a) a scanner interface for interfacing with an electro-optical scanner operative for scanning an indicium to be read;
    b) a status/condition interface for interfacing with the photodetector and the decoder whose status/condition is to be monitored;
    c) a memory for storing threshold information about the photodetector and the decoder;
    d) a system processor operatively connected to the interfaces and the memory, for generating updated information about the photodetector and the decoder from the status/condition interface during scanning, for retrieving the stored threshold information, for comparing the updated information with the retrieved threshold information, and for generating an output indicating signal upon such comparison; and
    e) an indicator responsive to the output indicating signal, for signaling to a user the status/condition of the photodetector and the decoder.

2. The arrangement of claim 1, wherein the scanner interface is operatively connected to an optical scan element in the scanner.

3. The arrangement of claim 1, wherein the memory is a discrete chip located away from the processor.

4. The arrangement of claim 1, wherein the indicator is a visual display.

5. The arrangement of claim 1, wherein the indicator is an audio generator.

6. The arrangement of claim 5, wherein the audio generator includes a synthesizer and a speaker to produce synthesized sounds.

7. A status/condition indicating method for use in an electro-optical system having components, including a photodetector and a decoder, for reading indicia having parts of differing light reflectivity, comprising the steps of:
    a) interfacing a scanner interface with an electro-optical scanner operative for scanning an indicium to be read;
    b) interfacing a status/condition interface with the photodetector and the decoder whose status/condition is to be monitored;
    c) storing in a memory threshold information about the photodetector and the decoder;
    d) operatively connecting a processor to the interfaces and the memory, generating updated information about the photodetector and the decoder from the status/condition interface during scanning, retrieving the stored threshold information, comparing the updated information with the retrieved threshold information, and generating an output indicating signal upon such comparison; and
    e) signaling in response to the output indicating signal, to a user the status/condition for the photodetector and the decoder.

8. The method of claim 7, wherein step (a) is performed by operatively connecting the scanner interface to an optical scan element in the scanner.

9. The method of claim 7, wherein the signaling step is performed by a visual display.

10. The method of claim 7, wherein the signaling step is performed by a sound generator.

* * * * *